United States Patent
Kuribayashi et al.

(10) Patent No.: US 6,775,246 B1
(45) Date of Patent: Aug. 10, 2004

(54) METHOD OF DETERMINING MASTER AND SLAVES BY COMMUNICATION CAPABILITY OF NETWORK NODES

(75) Inventors: Hirotaka Kuribayashi, Hamamatsu (JP); Yasushi Tamazawa, Hamamatsu (JP); Yoshinari Nakamura, Hamamatsu (JP); Tatsutoshi Abe, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 768 days.

(21) Appl. No.: 09/666,780

(22) Filed: Sep. 21, 2000

(30) Foreign Application Priority Data

Sep. 27, 1999 (JP) .......................................... 11-272340

(51) Int. Cl.[7] .............................................. H04L 12/28
(52) U.S. Cl. ...................................... 370/257; 84/645
(58) Field of Search .......................... 84/600, 601, 622, 84/645, 723; 370/254, 374, 438, 439; 385/95, 96; 455/414, 550.1, 563; 704/211, 267, 500; 709/208, 209, 248; 369/4; 381/118; 340/3.1, 3.2, 3.21, 825.2, 825.24, 825.25

(56) References Cited

U.S. PATENT DOCUMENTS

| | | | | |
|---|---|---|---|---|
| 5,229,533 A | * | 7/1993 | Sakurai ........................ | 84/618 |
| 5,875,354 A | * | 2/1999 | Charlton et al. ............... | 710/61 |
| 6,157,957 A | * | 12/2000 | Berthaud ..................... | 709/248 |
| 6,361,440 B1 | * | 3/2002 | Ogawa et al. ................. | 463/42 |

FOREIGN PATENT DOCUMENTS

JP    2000-078170    3/2000

OTHER PUBLICATIONS

Hirotaka Kuribayashi, et al., "Synchronous Communication" U.S. Serial No. 09/334,142 filed Jun. 15, 1999.

* cited by examiner

*Primary Examiner*—Wellington Chin
*Assistant Examiner*—John Shew
(74) *Attorney, Agent, or Firm*—Morrison & Foerster LLP

(57) ABSTRACT

A communication control apparatus is provided for setting a plurality of node apparatuses to either of a transmitter and a receiver of synchronization information to synchronize the node apparatuses with each other. A storage device memorizes capability information representing either of an active capability to transmit the synchronization information and a passive capability to receive the synchronization information, owned by each of the node apparatuses. An indicating device indicates the active capabilities and the passive capabilities owned by the node apparatuses. A specifying device is operated in association with the indicated active capabilities and the passive capabilities for outputting status information effective to specify each node apparatus to a transmitter or a receiver. A plurality of memory blocks are provided in correspondence to the plurality of the node apparatuses to memorize status information. A registering device registers each of the outputted status information into each memory block to set the corresponding node apparatus to a transmitter of the synchronization information when the status information specifies the transmitter, and to set the corresponding node apparatus to a receiver of the synchronization information when the status information specifies the receiver.

36 Claims, 15 Drawing Sheets

FIG.4

| | |
|---|---|
| SYNCHRONIZATION CAPABILITY INFORMATION | — CCP |
| SYNCHRONIZATION STATUS INFORMATION | — CST |
| Fs MANAGEMENT CAPABILITY INFORMATION | — FCP |
| Fs MANAGEMENT STATUS INFORMATION | — FST |
| COMMON MASTER INFORMATION | — CMS |

FIG.5A

| | Fs [kHz] | |
|---|---|---|
| | 44.1 | 48 |
| MASTER | DISABLED | ENABLED |
| SLAVE | DISABLED | ENABLED ← CST |

FIG.5B

| | Fs [kHz] | |
|---|---|---|
| | 44.1 | 48 |
| MASTER | DISABLED | ENABLED ← CST |
| SLAVE | DISABLED | DISABLED |

FIG.6

| MASTER/SLAVE SETTING METHOD | Fs SPECIFICATION | | |
|---|---|---|---|
| | Fs AUTO | 44.1 [kHz] | 48 [kHz] |
| AUTO MODE | ENABLED | DISABLED | DISABLED |
| PROFESSIONAL MODE | DISABLED | ENABLED | ENABLED |
| MANUAL MODE | DISABLED | DISABLED | DISABLED |

FST

FIG.13

| | CONDITIONS ON RECEPTION SIDE | | |
|---|---|---|---|
| CONDITIONS ON TRANSMISSION SIDE | CAPABLE OF BECOMING ONLY MASTER | CAPABLE OF BECOMING EITHER OF MASTER AND SLAVE | CAPABLE OF BECOMING ONLY SLAVE |
| CAPABLE OF BECOMING ONLY MASTER | S1 NOT SYNCHRONIZED USER IS ALARMED | S2 TRANSMISSION SIDE BECOMES MASTER AND RECEPTION SIDE BECOMES SLAVE | S3 TRANSMISSION SIDE BECOMES MASTER AND RECEPTION SIDE BECOMES SLAVE |
| CAPABLE OF BECOMING EITHER OF MASTER AND SLAVE | S4 RECEPTION SIDE BECOMES MASTER AND TRANSMISSION SIDE BECOMES SLAVE | S5 RECEPTION SIDE BECOMES MASTER AND TRANSMISSION SIDE BECOMES SLAVE | S6 TRANSMISSION SIDE BECOMES MASTER AND RECEPTION SIDE BECOMES SLAVE |
| CAPABLE OF BECOMING ONLY SLAVE | S7 RECEPTION SIDE BECOMES MASTER AND TRANSMISSION SIDE BECOMES SLAVE | S8 RECEPTION SIDE BECOMES MASTER AND TRANSMISSION SIDE BECOMES SLAVE | S9 NOT SYNCHRONIZED USER IS ALARMED |

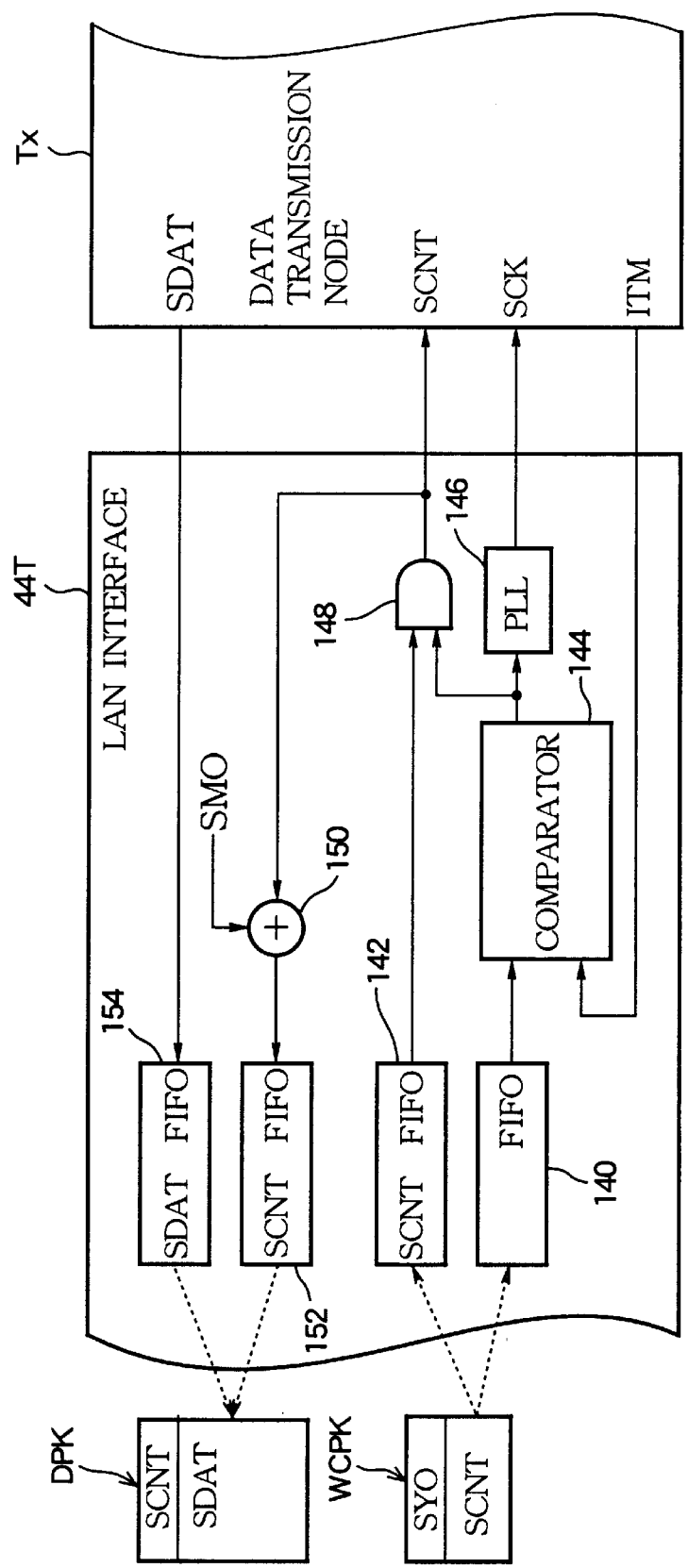

METHOD OF DETERMINING MASTER AND SLAVES BY COMMUNICATION CAPABILITY OF NETWORK NODES

BACKGROUND OF THE INVENTION

The present invention relates generally to a communication control apparatus preferably for use in a network such as a LAN (Local Area Network). More particularly, the present invention relates to a communication control apparatus that stores, for each of node apparatuses connected to the network, information representative of synchronization signal transmission and reception capabilities and synchronization signal transmission/reception setting status, and sets master and slaves of the synchronization signal appropriately and simply with reference to pieces of the stored information.

Systems for connecting plural music performance apparatuses (such as a synthesizer, a rhythm machine, a sequencer, and a computer) for synchronous performance are known in which MIDI (Musical Instrument Digital Interface) compliant apparatuses are interconnected by a MIDI cable to transmit a MIDI clock consisting of an 8-bit message of hexadecimal "FB" from one MIDI apparatus on the data transmission side to another MIDI apparatus on the data reception side, thereby performing music while taking synchronization based on this synchronization signal.

However the above-mentioned prior-art MIDI performance systems have a data transfer rate as low as 31.25 Kpbs, being incapable of constructing a system in which music is performed while transmitting sample data by use of a sampler having a sampling clock of 44.1 KHz.

A music performance system capable of providing high-speed data transfer may be constructed by use of a high-speed interface (having data transfer rates up to 10 through 50 Mbps) such as USB (Universal Serial Bus) or IEEE 1394. Currently, however, no sufficient researches have been carried out into the setting of master/slave for the synchronization information transmission/reception in such high-speed networks. As with the conventional MIDI scheme, it could be possible to adopt a scheme in which the synchronization information is always transmitted from an upstream of data to a downstream. However, such a rigid scheme causes the flow of the synchronization information to be restricted by the flow of music data, thereby making it impossible to provide proper settings of the master and slaves. It is also difficult with such a rigid scheme for users to execute master/slave setting by referring to instruction manuals and like.

SUMMARY OF THE INVENTION

It is therefore an object of the present invention to provide a novel communication control apparatus, which permits the proper and simple setting of transmission/reception nodes (master/slaves) of synchronization information in a high-speed network.

In carrying out the invention and according to one aspect thereof, there is provided a first communication control apparatus for setting a plurality of node apparatuses involved in a network to either of a transmitter and a receiver of synchronization information circulated through the network to synchronize the node apparatuses with each other. In the communication control apparatus, a storage device memorizes capability information representing either of an active capability to transmit the synchronization information and a passive capability to receive the synchronization information, owned by each of the node apparatuses. An indicating device indicates the active capabilities and the passive capabilities owned by the node apparatuses involved in the network according to the memorized capability information. A specifying device is operated in association with the indicated active capabilities and the passive capabilities of the node apparatuses for outputting status information effective to specify each node apparatus to a transmitter or a receiver of the synchronization information. A plurality of memory blocks are provided in correspondence to the plurality of the node apparatuses to memorize status information of the corresponding node apparatuses. A registering device registers each of the outputted status information into each memory block to set the corresponding node apparatus to a transmitter of the synchronization information when the status information specifies the transmitter, and to set the corresponding node apparatus to a receiver of the synchronization information when the status information specifies the receiver.

According to the first communication apparatus, the indicating device indicates the capability of transmission or reception on the basis of the synchronization capability information stored in the storage device for each of the plurality of node apparatuses. The user refers to the indication made by the indicating device and specifies the transmission or the reception of synchronization information for each node apparatus through the specifying device. Synchronization status information indicative of the transmission of synchronization information is written to the memory block corresponding to the node apparatus for which the transmission of synchronization information has been specified. Synchronization status information indicative of the reception of synchronization information is written to the memory block corresponding to the node apparatus for which the reception of synchronization information has been specified. Consequently, the user can simply and surely specify the transmission/reception of synchronization information for each node according to the indication made by the indicating device, thereby providing the transmission/reception setting as specified by the user.

In carrying out the invention and according to another aspect thereof, there is provided a second communication control apparatus for setting a plurality of node apparatuses including a first node apparatus and a second node apparatus involved in a network to either of a transmitter and a receiver of synchronization information circulated through the network to synchronize the node apparatuses with each other. In the communication control apparatus, a storage device memorizes common master information effective to specify the first node apparatus to a transmitter of synchronization information commonly used throughout the network. A determining device operates based on the memorized common master information for outputting status information effective to determine the second node apparatus to a receiver of the synchronization information transmitted from the first node apparatus. A memory block is provided in correspondence to the second node apparatus to memorize status information of the second node apparatus. A registering device registers the outputted status information into the memory block to set the second node apparatus to a receiver of the synchronization information.

According to the second communication control apparatus, the storage device stores the common master information for specifying the first node apparatus as a transmitter of synchronization information common to the network. The determining device determines, for the second node apparatus, the reception of synchronization information from the first node apparatus on the basis of the common master information stored in the storage device. Synchronization status information indicative of the reception of synchronization signal is written to the memory block according to the determination made by the determining device. Consequently, the reception of synchronization information can be automatically determined on the basis of the common master information, allowing the setting of reception in accordance with the automatic determination.

In carrying out the invention and according to still another aspect thereof, there is provided a third communication control apparatus for setting a plurality of node apparatuses involved in a network to either of a transmitter and a receiver of synchronization information circulated through the network to synchronize the node apparatuses with each other. In the communication control apparatus, a storage device memorizes capability information representing either of an active capability to transmit the synchronization information and a passive capability to receive the synchronization information, possessed by each of the node apparatuses. An indicating device indicates node apparatuses possessing the active capabilities according to the memorized capability information. A specifying device outputs common master information effective to specify one node apparatus among the indicated node apparatuses to a transmitter of synchronization information commonly used throughout the network. A first memory block memorizes the common master information outputted from the specifying device. A determining device operates based on the memorized common master information for outputting status information effective to determine another node apparatus among the plurality of the node apparatuses to a receiver of the synchronization information transmitted from said one node apparatus. A second memory block is provided in correspondence to said another node apparatus to memorize status information of said another node apparatus. A registering device registers the outputted status information into the second memory block to set said another node apparatus to a receiver of the synchronization information.

According to the third communication control apparatus, a node apparatus capable of transmission is indicated by the indicating device on the basis of synchronization capability information stored in the storage device. The user refers to the indication made by the indicating device to specify through the specifying device one node apparatus as a transmitter (a common master) of synchronization information common to the network. The common master information indicative of one node apparatus associated with the specification is stored in the first memory block. The determining device determines, for another node apparatus associated with the specification, the reception of synchronization information from one node apparatus associated with the specification on the basis of the common master information stored in the first memory block. Synchronization status information indicative of the reception of synchronization information is written to the second memory block according to the determination made by the determining device. Consequently, the user can simply specify a desired node apparatus as the common master according to the indication made by the indicating device, thereby the determining device automatically determining the reception of synchronization information in another node apparatus with respect to the specified common master. This permits the setting of transmission/reception in accordance with user specification and automatic determination.

In carrying out the invention and according to yet another aspect thereof, there is provided a fourth communication control apparatus for setting a plurality of node apparatuses including a first node apparatus, a second node apparatus and a third node apparatus involved in a network to either of a transmitter and a receiver of synchronization information circulated through the network to synchronize the node apparatuses with each other. In the communication control apparatus, a memory block memorizes status information effective to specify the first node apparatus to a receiver of the synchronization information transmitted from the second node apparatus. A determining device operates based on the memorized status information for outputting status information effective to determine the third node apparatus to a receiver of the synchronization information transmitted from the second node apparatus. Another memory block is provided in correspondence to the third node apparatus to memorize status information of the third node apparatus. A registering device registers the outputted status information into said another memory block to set the third node apparatus to a receiver of the synchronization information.

According to the fourth communication control apparatus, synchronization status information indicative of the reception of synchronization information from the second node apparatus by the first node apparatus is stored in the memory block. The determining device determines, for the third node apparatus, the reception of synchronization information from the second node apparatus on the basis of the synchronization status information stored in the memory block. Synchronization status information indicative of the reception of synchronization information from the second node apparatus is written to a memory block of the third node apparatus in accordance with the determination made by the determining device. Consequently, the reception of synchronization information can be automatically determined on the basis of the synchronization status information, thereby allowing the setting of reception in accordance with the automatic determination.

In carrying out the invention and according to a different aspect thereof, there is provided a fifth communication control apparatus for setting a plurality of node apparatuses including a first node apparatus and a second node apparatus involved in a network to either of a transmitter and a receiver of synchronization information circulated through the network to synchronize the node apparatuses with each other. In the communication control apparatus, a memory block memorizes active status information effective to specify the first node apparatus to a transmitter of synchronization information. A determining device operates based on the memorized active status information for outputting passive status information effective to determine the second node apparatus to a receiver of the synchronization information transmitted from the first node apparatus. Another memory block is provided in correspondence to the second node apparatus to memorize status information of the second node apparatus. A registering device registers the outputted passive status information into said another memory block to set the second node apparatus to a receiver of the synchronization information.

According to the fifth communication control apparatus, synchronization status information indicative of the transmission of synchronization information from the first node apparatus is stored in the memory block. The determining device determines, for the second node apparatus, the reception of synchronization information from the first node apparatus on the basis of the synchronization status information stored in the memory block. Synchronization status information indicative of the reception of synchronization information from the first node apparatus is written to another memory block corresponding to the second node apparatus in accordance with the determination made by the determining device. Consequently, the reception of synchronization information can be automatically determined on the basis of the synchronization status information, thereby allowing the setting of reception in accordance with the automatic determination.

In carrying out the invention and according to a still different aspect thereof, there is provided a sixth communication control apparatus for setting a plurality of node apparatuses including a first node apparatus and a second node apparatus involved in a network to either of a transmitter and a receiver of synchronization information circulated through the network to synchronize the node apparatuses with each other. In the communication control apparatus, a storage device memorizes capability information representing either of an active capability to transmit the synchronization information and a passive capability to receive the synchronization information, owned by each of the first node apparatus and the second node apparatus. A determining device is operated according to a predetermined rule and according to the active capability and the passive capability owned by the first and second node apparatuses for outputting status information effective to specify either of the first and second node apparatuses to a transmitter or a receiver of the synchronization information. First and second memory blocks are provided in correspondence to the first and second node apparatuses to memorize status information of the corresponding node apparatuses. A registering device registers the status information into the first memory block to set the first node apparatus to a transmitter or a receiver of the synchronization information when the status information is determined for the first node apparatus, and registers the status information into the second memory block to set the second node apparatus to a transmitter or a receiver of the synchronization information when the status information is determined for the second node apparatus.

According to the sixth communication control apparatus, the determining device determines the transmission or reception of synchronization information for each of the first and second node apparatuses on the basis of the synchronization capability information stored in the storage device and in accordance with the predetermined determination rule. Synchronization status information indicative of the transmission or reception of synchronization information is written to the first memory block in accordance with the determination made by the determining device with respect to the first node apparatus. Otherwise, synchronization status information indicative of the transmission or reception of synchronization information is written to the second memory block in accordance with the determination made by the determining device with respect to the second node apparatus. Consequently, the transmission/reception of synchronization information can be automatically determined on the basis of the synchronization status information, thereby allowing the setting of transmission/reception in accordance with the automatic determination.

BRIEF DESCRIPTION OF THE DRAWINGS

FIG. 4 is a diagram illustrating various memory sections in a non-volatile memory.

FIGS. 5A and 5B are a diagram illustrating contents of synchronization capability information.

FIG. 6 is a diagram illustrating contents of Fs management capability information.

FIG. 13 is a diagram illustrating another example of master/slave determination.

FIG. 14 is a diagram illustrating a clock reception and data transmission circuit of a data transmission node.

DETAILED DESCRIPTION OF THE INVENTION

Figure 1:
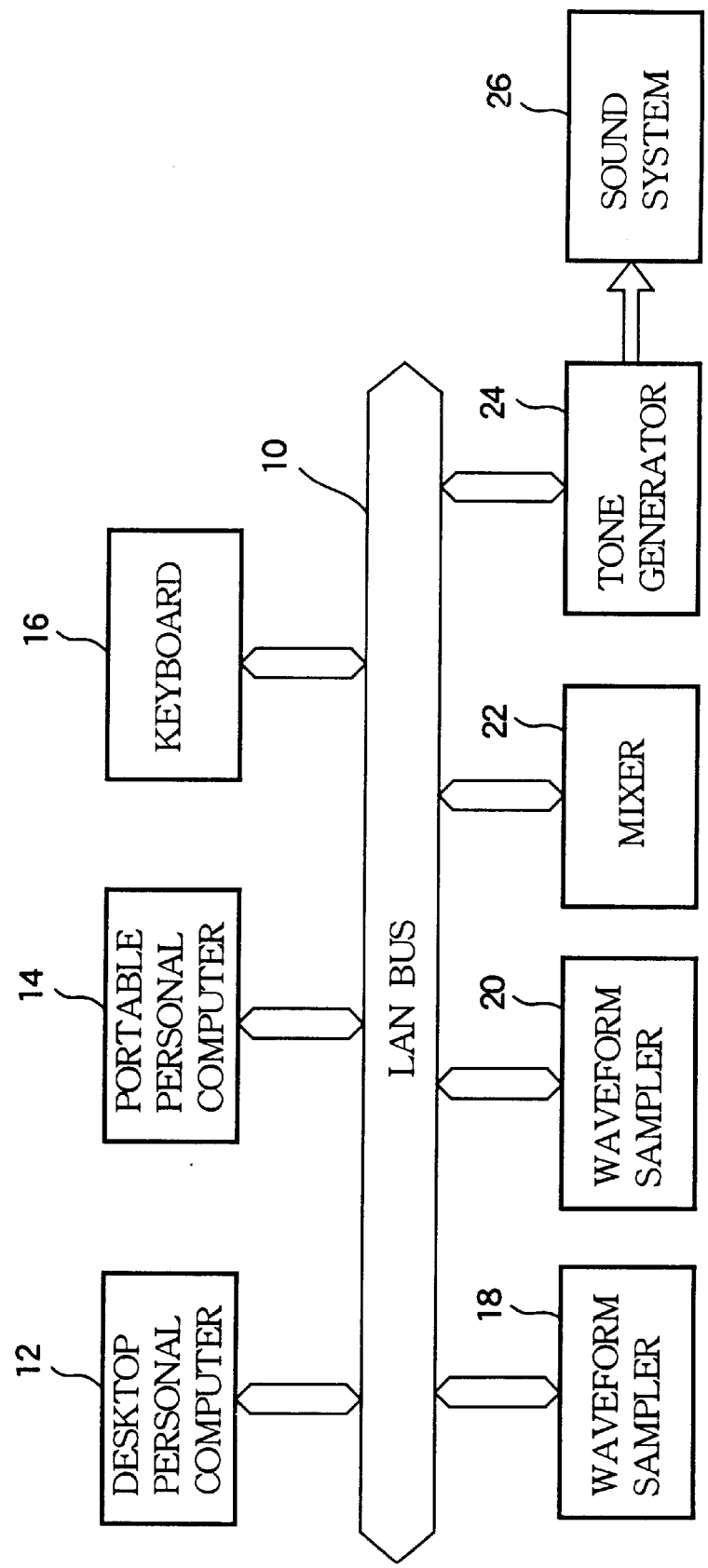
FIG. 1 is a block diagram illustrating the configuration of a LAN network practiced as one embodiment of the invention.

FIG. 1 is a block diagram illustrating the configuration of a LAN network practiced as one embodiment of the invention, the LAN network being preferably for use in music performance.

A LAN bus 10 is connected to music performance apparatuses such as a desktop personal computer 12, a note-type portable personal computer 14, a music keyboard 16, a waveform samplers 18, 20, a mixer 22, and a tone generator 24. The LAN bus 10 is compliant with the IEEE 1394 standard for example. It may also be a bus compliant with other high-speed interface standards such as the USB standard.

The personal computers 12, 14 each have sequencer software and performance data for plural pieces of music, and provide capabilities of editing desired performance data on the basis of the sequences software and executing automatic performance on the basis of predetermined performance data.

The keyboard 16 has keys for music performance and outputs performance data in accordance with key operations executed on the keyboard.

The waveform samplers 18, 20 each sample an analog audio signal (a voice signal) inputted from an input device such as a microphone or a recorder to generate sample data (waveform data) representing an amplitude value for each sample obtained, thereby outputting the generated sample data. The frequency of a sampling clock used is 48 KHz for example; it may be 44.1 KHz or selectable between 48 KHz and 44.1 KHz.

The mixer 22 mixes the sample data (the waveform data), thereby outputting the mixed sample data.

The tone generator 24 has plural sounding channels (16 for example) and can specify multi-level pitches (128 for example) for each sounding channel. In addition, the tone generator can assign many timbres (100 to 1000 for example) to each sounding channel and sound music tones on the basis of externally supplied waveform data.

The sound system 26 includes a power amplifier for right and left channels and a speaker, and converts a tone signal supplied from the tone generator 24 into acoustic sound.

Figure 2:
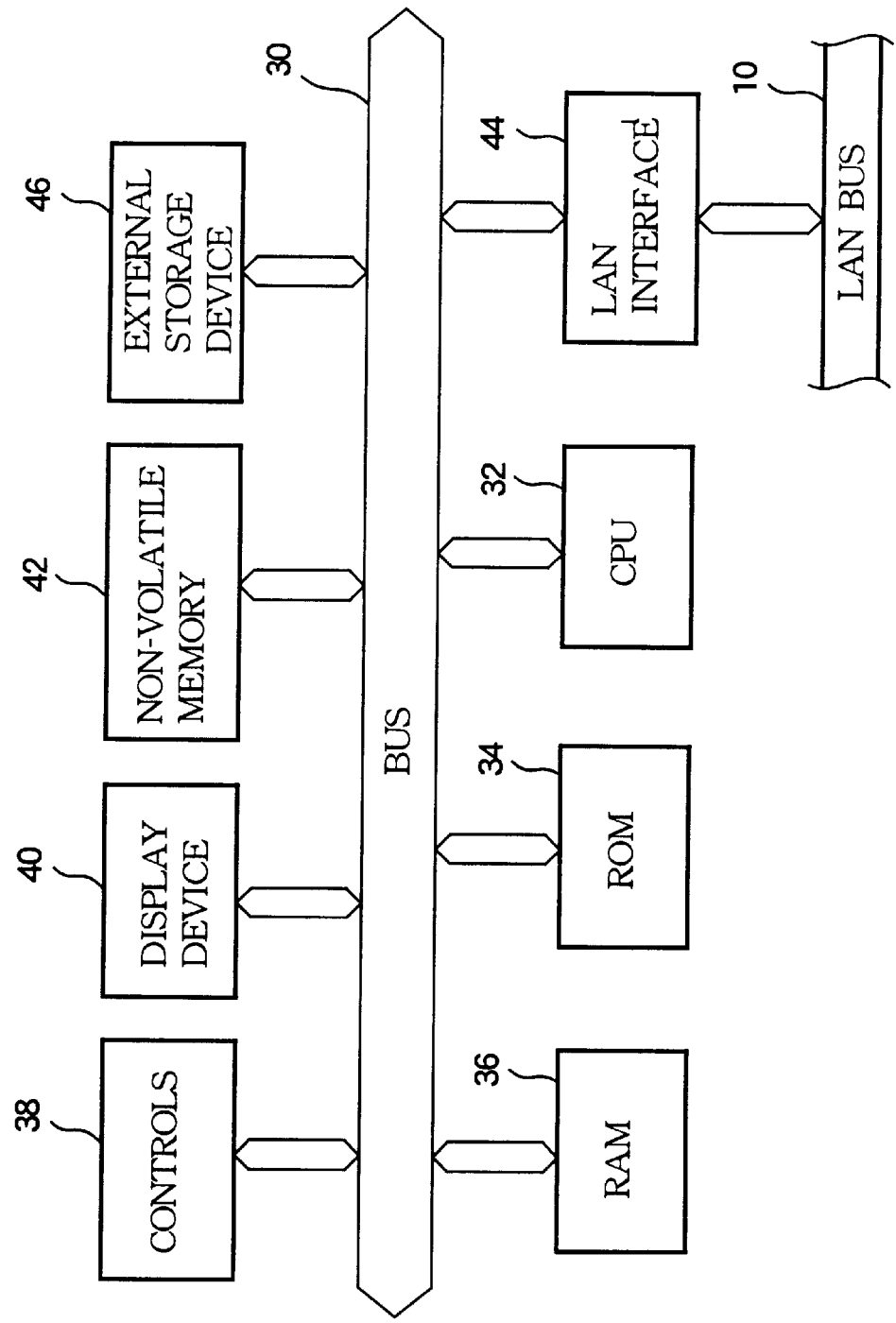
FIG. 2 is a block diagram illustrating the configuration of a desktop personal computer shown in FIG. 1.

FIG. 2 is a block diagram illustrating the configuration of the desktop personal computer 12 shown in FIG. 1. The desktop personal computer 12 may work as a communication control apparatus according to the invention. A bus 30 is connected to a CPU (Central Processing Unit) 32, a ROM (Read Only Memory) 34, a RAM (Random Access Memory) 36, a controls group 38, a display device 40, a non-volatile memory 42, a LAN interface 44, and an external storage device 46.

The CPU 32 executes various processing operations as instructed by programs stored in the ROM 34. The programs may be provided by a machine readable medium such as an magnetic or optical disk loaded into the external storage device 46. The RAM 36 includes a storage area for use as registers, which hold data resulted from the processing executed by the CPU 32. The controls group 38 includes a keyboard having numeric and character keys for example and also includes a mouse as a pointing device. The display device 40 can display various pieces of information on a display screen and a cursor, which is operated by the mouse of the controls group 38. The non-volatile memory 42 can retain stored information after the power supply is turned off. As shown in FIG. 4, this memory includes various memory blocks, which will be described later. The LAN interface 44 is compliant with the IEEE 1394 standard for example. Interfaces compliant with high-speed interface standards such as USB may also be used. The external storage device 46 includes a recording medium such as a magnetic or optical disk, which stores performance data for many pieces of music.

The performance data for a desired piece of music can be read from the external storage device 46 into the RAM 36 by operating the controls group 38. The performance data read in the RAM 36 are displayed on the display device 40 to be edited as desired by operating the controls group 38. Before or after such edit processing, note-on information (a sounding command and pitch specification information) and note-off information (a muting command and pitch specification information) included in the performance data in the RAM 36 may be transmitted to the tone generator 24 through the LAN interface 44 and the LAN bus 10 by taking synchronization on the basis of synchronization information to be described later, thereby executing automatic performance of music.

The configuration described above is that of the personal computer 12. The other personal computer 14 has generally the same configuration except for the external storage device 46. The personal computer 14 can share the performance data stored in the external storage device 46 with the personal computer 12 to execute the same performance data edit processing and music automatic performance for example as the personal computer 12.

The music keyboard 16 has a configuration equivalent to that shown in FIG. 2 except that a music performance keyboard unit is provided instead of the external storage device 46. The keyboard 16 allows the user to manually play music by transmitting information such as note-on and note-off information to the tone generator 24 through the LAN interface 44 and the LAN bus 10 of the network.

The waveform samplers 18 and 20 each have a configuration equivalent to that shown in FIG. 2 except that a sampling A/D (Analog/Digital) converter is provided instead of the external storage device. The user can generate tones based on sample data by transmitting the sample data from the A/D converter of the waveform sampler 18 or 20 to the tone generator 24 through the LAN interface 44 and the LAN bus 10 of the network.

The mixer 22 has a configuration equivalent to that shown in FIG. 2 except that a DSP (Digital Signal Processor) device is provided instead of the external storage device 46. The mixer 22 can mix the sample data supplied from the waveform samplers 18 and 20 for example. The user can generate tones based on mixed sample data by transmitting the mixed sample data from the mixer 22 to the tone generator 24 through the LAN interface 44 and the LAN bus 10 of the network.

The tone generator 24 has a configuration equivalent to that shown in FIG. 2 except that a tone generating unit is provided instead of the external storage unit 46. The tone generating unit has 16 sounding channels for example, each of which is assigned with performance information such as timbre, note-on, and note-off by the CPU 32 of the user's apparatus selected from node apparatuses involved in the network, thereby generating tone signals. An audio output terminal of the tone generating unit is connected to the sound system 26 from which tone signals are sounded.

In the music performance apparatuses 12 through 24 shown in FIG. 1, the ROM 34 of the user's apparatus, which is one of the node apparatuses, or the ROM in the LAN interface 44 of the user's apparatus stores communication control software (LAN management software). The CPU 32 of the user's apparatus determines flows of music data and synchronization information among plural node apparatuses as instructed by the communication control software in accordance with the operation executed on the controls group 38 of the user's apparatus. Thus, the user's apparatus selected from among the node apparatuses 12 through 24 serves as the inventive communication control apparatus.

Figure 3:
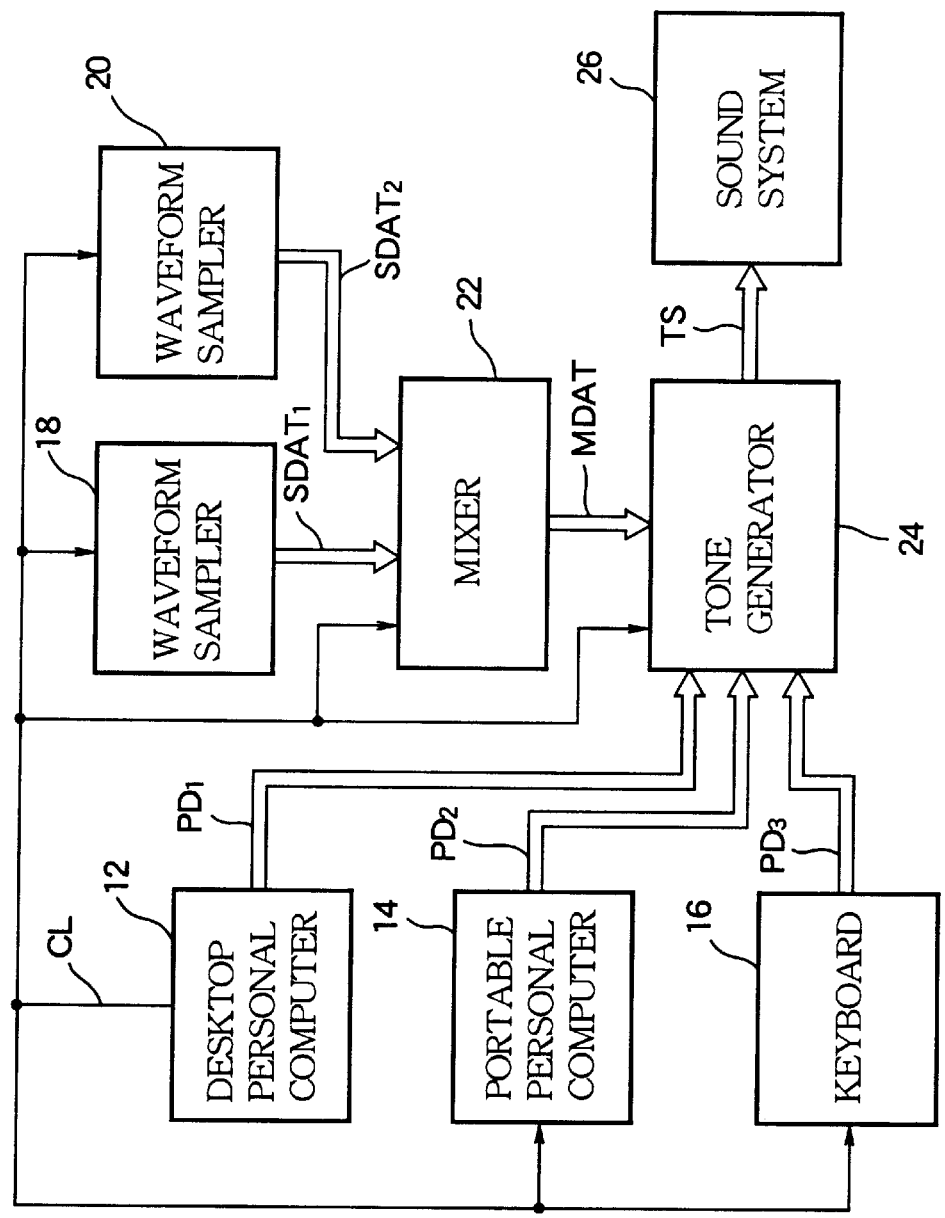
FIG. 3 is a block diagram illustrating an example of music data and synchronization information flows.

FIG. 3 is a block diagram illustrating an example of the data and synchronization information flows thus determined. FIG. 3 shows the flows of data and a clock signal (synchronization information) among plural music performance apparatuses connected to the LAN network illustrated in FIGS. 1 and 2.

In terms of data flow, performance data $PD_1$ such as note-on/off from the personal computer 12, performance data $PD_2$ such as note-on/off from the personal computer 14, and performance data $PD_3$ such as note-on/off from the keyboard 16 are supplied to the tone generator 24. Sample data $SDAT_1$ from the waveform sampler 18 and sample data $SDAT_2$ from the waveform sampler 20 are supplied to the mixer 22, the mixed sample data MDAT being supplied to the tone generator 24.

A clock signal CL is supplied from the personal computer 12 to the personal computer 14, the keyboard 16, the waveform samplers 18 and 20, the mixer 22, and the tone generator 24. The tone generator 24 can generate a tone signal based on the mixed sample data MDAT in synchronization with the clock signal CL as instructed by any of the data $PD_1$ through $PD_3$, thereby permitting synchronous performance by use of the sample data.

For synchronization, each of the performance apparatuses 12 through 24 incorporates a clock source for generating a high-speed clock signal. From this high-speed clock signal, the clock signal CL can be generated. For the clock signal CL, the clock edge of word clock is transmitted at a predetermined interval To (To=8 in FIG. 16) such as sample count SCNT=24, 32, 40, and so on. Each node apparatus that has received the clock signal CL generates an internal clock signal synchronized with the clock signal CL on the basis of the high-speed clock signal. Specific examples of transmitting and receiving data and clock signals will be described with reference to FIGS. 14 through 16.

The present invention relates to a technology of setting the transmission/reception (master/slave) of synchronization information (the clock signal CL). This setting technology forms a part of the above-mentioned communication control software and will be described later with reference to FIGS. 4 through 13. FIG. 3 indicates that the flow of the clock signal CL is set independently of the flow of data.

FIG. 4 is a diagram illustrating various memory blocks provided in the non-volatile memory 42 of each node apparatus. Memory blocks CCP, CST, FCP, FST, and CMS can store synchronization capability information, synchronization status information, Fs management capability information, Fs management status information, and common master information, respectively. "Fs" herein denotes sampling clock frequency. In what follows, the music performance apparatuses 12 through 24 are referred to as nodes for the purpose of description.

Synchronization capability information indicates presence or absence of a master capability (transmission capability) and/or a slave capability (receive capability) for each Fs. The master capability herein denotes a capability of transmitting a clock signal by a node concerned itself without being supplied with a clock signal from another node. The synchronization capability information stored in the memory block CCP cannot be changed in principle. However, it may be changed when the user changes settings inside the node main.

FIG. 5A is a diagram illustrating an example of the synchronization capability information. This example has neither master capability nor slave capability for Fs=44.1 KHz but has both for Fs=48 KHz.

FIG. 5B is a diagram illustrating an example in which the user changed the settings in the node main, thereby making the node be capable of becoming only the master for Fs=48 KHz. In this example, the contents of the synchronization capability information is changed so that the node becomes incapable of becoming the slave for Fs=48 KHz.

The synchronization status information indicates whether the node is master or slave along with Fs. When this information indicates that the node is slave, it also indicates which node is master. In this case, the synchronization status information can indicate one of the master and slave states which are represented by the synchronization capability information of the same node as having the capability. Namely, the synchronization status information cannot represent the master or slave state which is represented by the synchronization capability information of the same node as having no capability. The synchronization status information stored in the memory block CST may be changed by another node or when the user changes settings inside the node main.

In the example shown in FIG. 5A, the synchronization status information in the memory block CST indicates that the node concerned is slave for Fs=48 KHz and a node which is master. When the contents of the synchronization capability information have been changed as shown in FIG. 5B due to the setting change made by the user, the synchronization status information is changed so as to represent the master state of Fs=48 KHz permitted by the synchronization capability information.

The Fs management capability information represents selection among three of master/slave settings for Fs specifications as shown in FIG. 6. There are three Fs specifications; Fs auto, 44.1 KHz, and 48 KHz. In Fs auto, an Fs value is automatically selected depending on a situation. There are three master/slave setting modes; auto mode, professional mode, and manual mode. In the auto mode, the transmission/reception of synchronization information is automatically determined on the basis of synchronization status information or synchronization capability information. In the professional mode, the reception of synchronization information is automatically determined on the basis of common master information. In the manual mode, the user specifies the transmission/reception of synchronization information with reference to the transmission/reception capability indicated on the basis of synchronization capability information. The auto mode is for general users not well familiar with digital audio technology, while the professional mode and the manual mode are for users versed in digital audio.

The Fs management capability information stored in the memory block FCP cannot be changed in principle, but may be changed when the user changes the internal settings of the node main. In the example shown in FIG. 6, when the auto mode is selected, an appropriate Fs value is automatically selected by specifying "Fs auto" without specifying any Fs value. When the professional mode is selected, only the Fs value with 44.1 KHz or 48 KHz specified can be used.

The Fs management status information represents any of the modes and Fs values that is made selectable by the Fs management capability information. The Fs management status information stored in the memory block FST may be changed by another node. It should be noted that there should be no contradiction between the above-mentioned synchronization capability information, synchronization status information, Fs management capability information, and Fs management status information.

The example shown in FIG. 6 illustrates the professional mode with the synchronization status information in the memory block FST being Fs=48 KHz. For this mode, the auto mode of Fs auto or the professional mode of 44.1 KHz may be selected. However, the manual mode cannot be selected for any of the three Fs specifications.

The common master information specifies a transmission node (a common master) of synchronization information common to the network for each Fs. Use of the common master information allows the automatic determination of the reception (slave) of synchronization information in the professional mode and, at the same time, omission of the inclusion of the information indicative of a node which is master into the synchronization status information. Only one common master exists for each Fs. For example, one common master for 44.1 KHz and one common master for 48 KHz may exist but no plural common masters exist for 44.1 KHz.

Common master setting is executed by an explicit operation of the user. If a common master already exists, its Fs can be changed by an explicit operation by the user. If this is done, the node which has been common master so far is no common master any more. The user can cancel the common master by specifying the corresponding node.

If the user changes the Fs of a common master, that node is no more the common master of the original Fs. For example, if the Fs of a common master is changed from 48 KHz to 44.1 KHz, that node is no more the common master of 48 KHz. Thereafter, another node of 44.1 KHz may be made a common master automatically or by the discretion of the user.

Figure 7:
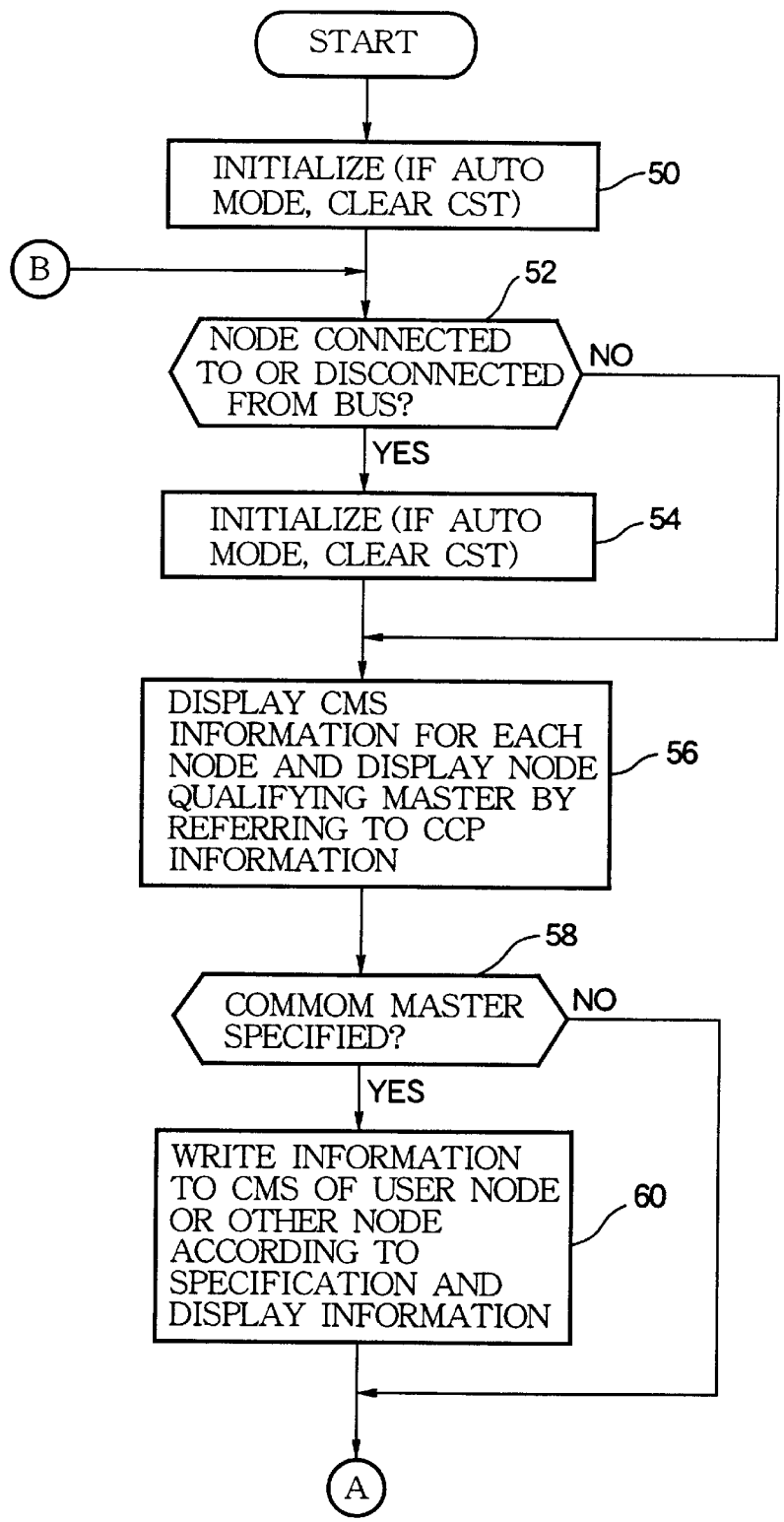
FIG. 7 is a flowchart describing a part of master/slave setting processing.
Figure 8:
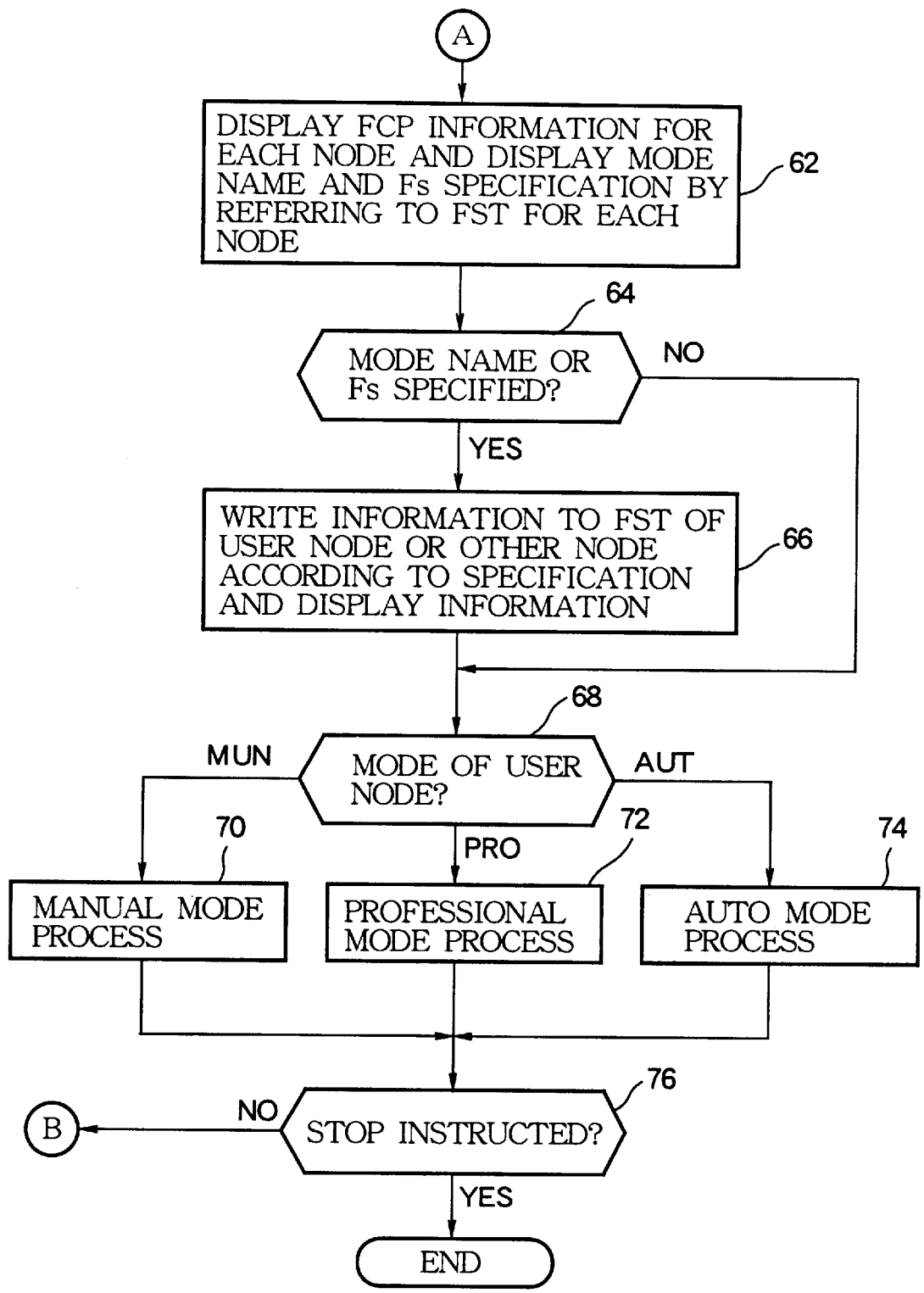
FIG. 8 is a flowchart describing a remaining part of the master/slave setting processing.

FIGS. 7 and 8 are flowcharts describing master/slave setting process. This process is executed in any of the nodes.

In the following description, the node shown in FIG. 2 is exemplified as the communication control apparatus. The other nodes may serve as the communication control apparatus in the same manner. The process shown in FIGS. 7 and 8 is started when the power switch is turned on with the node shown in FIG. 2 connected to the LAN bus 10.

In step 50, the registers are initialized. At this moment, if the Fs management status information stored in the memory block FST indicates the auto mode, the synchronization status information stored in the memory block CST is cleared. This is because, for the auto mode, new master/slave setting must be executed regardless of the previous master/slave setting. For the professional mode, the synchronization status information in the memory block CST and the common master information in the memory block CMS are not cleared, so that the previous master/slave setting is maintained. For the manual mode, the synchronization status information in the memory block CST is not cleared, so that the previous master/slave setting is reproduced.

In step 52, it is determined whether a new node is connected with the LAN bus 10 or an old node is disconnected from the LAN bus 10. If the decision is yes, then the same initialization processing as that of step 50 is executed in step 54. The same initialization processing as that executed at the power-on sequence is executed because the system configuration changes at the time of connection and disconnection of a node.

If the decision in step 52 is no or when the processing of step 54 comes to an end, then, in step 56, the common master information in the memory block CMS is displayed on the display device of the communication control apparatus for each node and the nodes having master capability are indicated with reference to the synchronization capability information in the memory block CCP of each node. The common master information may not be displayed because there is no node having master capability. Display of the nodes having master capability is made on the display screen of the display device 40. Various display operations to be described later are also made on the display device 40.

In step 58, it is determined whether the common master has been specified from the controls group 38. Because the information in the memory block CMS of each node was collected and displayed in step 56, the user can determine whether to specify (and change) the common master after confirming the presence or absence of the common master. Because the node having master capability is displayed on the basis of the information stored in the memory block CCP of each node in step 56, the user can specify a desired node as the common master by referring to the display. The specification can be made by use of the corresponding keys and/or the mouse of the controls group 38. This holds true with various operations such as specification, selection, and indication to be described later.

If the decision in step 58 is yes, then, in step 60, the common master information (indicative of common master and Fs) is written to the memory block CMS of the user's node or another node according to the specification, displaying this common master information for the corresponding node. If the previous common master information is found in the memory block CMS, it is overwritten by the new information.

If the decision in step 58 is no or the processing in step 60 has come to an end, then, in step 62, the Fs management capability information in the memory block FCP is displayed for each node and, at the same time, the node name and the Fs specification are displayed by referring to the Fs management status information in the memory block FST for each node. The Fs management status information may not be displayed because of its absence.

Next, in step 64, it is determined whether the mode name or the Fs has been specified from the controls group 38. Because the information stored in the memory blocks FCP and FST of each node is displayed in step 62, the user can specify (and change) the mode and the Fs of the user's node or other node by referring to the displayed information.

If the decision of step 64 is yes, then, in step 66, the Fs management status information (mode name and Fs specification) is written to the memory block FST of the user's node or other node according to the specification, thereby displaying this Fs management status information for the corresponding node. If the previous Fs management status information is found in the memory block FST, it is overwritten by the new information.

If the decision in step 64 is no or the processing of step 66 has come to an end, then, in step 68, it is determined the mode in which the user's node is placed. If the decision is the manual mode (MUN), then, in step 70, the manual mode processing is executed as will be described with reference to FIG. 9. If the decision in step 68 is the professional mode (PRO), then, in step 72, the professional mode processing is executed as will be described with reference to FIG. 10. Further, if the decision in step 68 is the auto mode (AUT), then, in step 74, the auto mode processing is executed as will be described with reference to FIG. 11.

If the processing in step 70, 72, or 74 has come to an end, then, in step 76, it is determined whether the end of master/slave setting process has been instructed from the controls group 38. If the decision if no, then, back to step 52, the above-mentioned processing is repeated. If the decision is yes, the master/slave setting process comes to an end.

Figure 9:
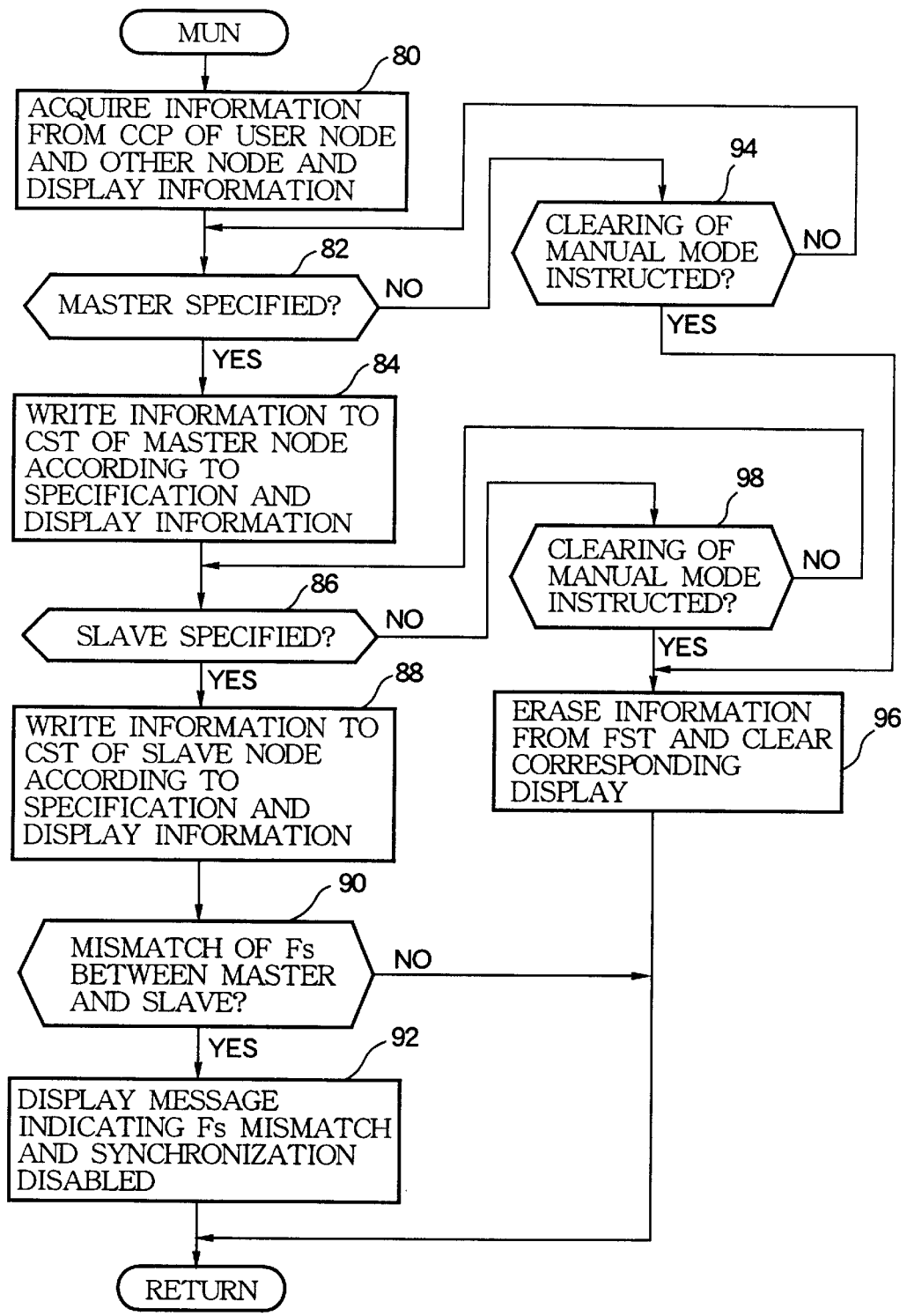
FIG. 9 is a flowchart describing manual mode processing.

FIG. 9 is a flowchart describing the manual mode processing. In step 80, synchronization capability information is acquired from the memory blocks CCPs of the user's node and other nodes and the acquired information is stored in the storage device and displayed on the display device. The user can specify the master or slave for a desired node by referring to the displayed information.

Next, in step 82, it is determined whether master specification has been made from the controls group 38. If the decision is yes, then, in step 84, the synchronization status information (indicative of the master and Fs) is written to the memory block CST of the master node according to the specification, displaying this synchronization status information. If the previous synchronization status information is found in the memory block CST of the master node associated with the specification, it is overwritten with the new information.

Next, in step 86, it is determined whether slave specification has been made from the controls group 38. If this decision is yes, then, in step 88, the synchronization status information (indicative of the slave, the associated master node, and the Fs) is registered to the memory block CST of the slave node according to the specification, displaying this synchronization status information. If the previous synchronization status information is found in the memory block CST of the slave node associated with the specification, it is overwritten with the new information.

Next, in step 90, it is determined whether there is a mismatch in Fs between master node and slave node. If the decision is yes, then, in step 92, a message is displayed telling that synchronization is disabled due to Fs mismatch.

If the decision is no or the processing of step 92 has come to an end, the routine shown in FIGS. 7 and 8 is resumed.

If the decision in step 82 is no, then, in step 94, it is determined whether the clearing of the manual mode has been instructed from the controls group 38. If this decision is no, then, back to step 82, the operation for master specification is waited for. If the decision of step 94 is turned yes, then, in step 96, the Fs management status information (indicative of the manual mode and the Fs) is erased from the memory block FST of the user's node and the corresponding display is also turned off.

If the decision in step 86 is no, then, in step 98, it is determined whether the clearing of the manual mode has been specified from the controls group 38. If this decision is no, then, back to step 86, the operation for slave specification is waited for. If the decision in step 98 is turned yes, then, in step 96, the Fs management status information is erased from the memory block FST of the user's node and the corresponding display is also turned off. Then, the routine shown in FIGS. 7 and 8 is resumed.

As described above, the communication control apparatus is provided in the form of the personal computer 12 or else for setting a plurality of node apparatuses 12 through 24 involved in a network 10 to either of a transmitter and a receiver of synchronization information circulated through the network to synchronize the node apparatuses with each other. In the communication control apparatus, a storage device such as RAM 36 memorizes capability information representing either of an active capability to transmit the synchronization information and a passive capability to receive the synchronization information, owned by each of the node apparatuses 12 through 24. An indicating device such as the display device 40 indicates the active capabilities and the passive capabilities owned by the node apparatuses 12 through 24 involved in the network according to the memorized capability information. A specifying device such as the controls group 38 is operated in association with the indicated active capabilities and the passive capabilities of the node apparatuses for outputting status information effective to specify each node apparatus to a transmitter or a receiver of the synchronization information. A plurality of memory blocks are provided in correspondence to the plurality of the node apparatuses 12 through 24 in the form of non-volatile memory 42 to memorize status information of the corresponding node apparatuses 12 through 24. A registering device implemented by the CPU 32 registers each of the outputted status information into each memory block to set the corresponding node apparatus to a transmitter of the synchronization information when the status information specifies the transmitter, and to set the corresponding node apparatus to a receiver of the synchronization information when the status information specifies the receiver.

Specifically, the plurality of the node apparatuses 12 through 24 can transfer data through the network at one of multiple sampling frequencies based on the synchronization information, such that the storage device stores a multiple of the capability information in correspondence to the multiple sampling frequencies, and such that each memory block stores a multiple of the status information corresponding to the multiple sampling frequencies. The plurality of the node apparatuses 12 through 24 are connected to each other through a local area network 10. The plurality of the node apparatuses 12 through 24 transact music data representing a music piece with each other in response to the synchronization information through the local area network to constitute a music system for generating the music piece.

Figure 10:
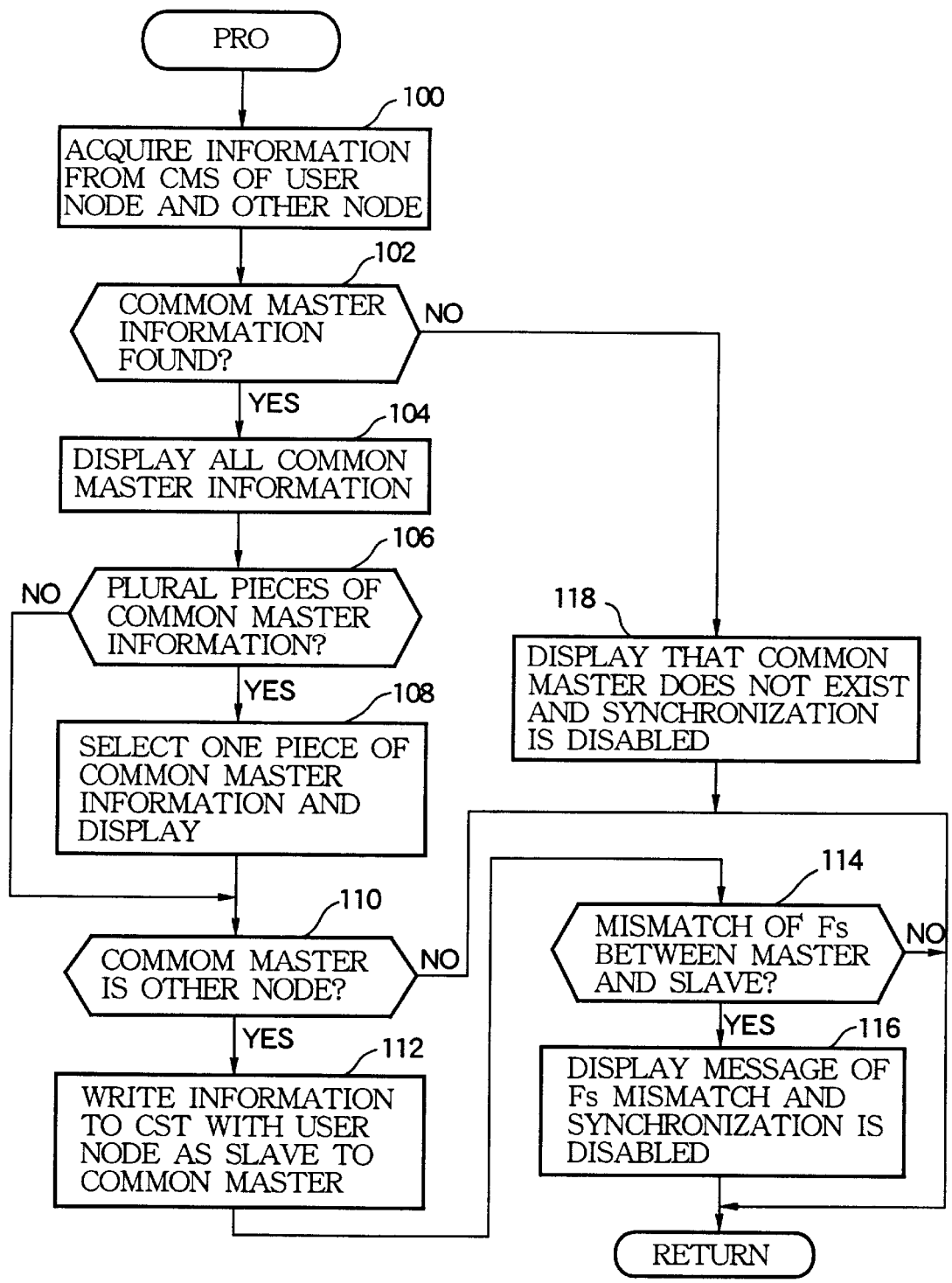
FIG. 10 is a flowchart describing professional mode processing.

FIG. 10 is a flowchart describing the professional mode. In step 100, information is acquired from the memory blocks CMSs of the user's node and other nodes. Then, in step 102, it is determined whether the common master information is included in the acquired information.

If the decision in step 102 is yes, then, in step 104, all common master information is displayed. In step 106, it is determined whether there are plural pieces of common master information. If this decision is yes, then, in step 108, one piece of common master information is selected according to the instruction by the user, and the selected piece of common master information is displayed. At this time, the user can instruct the selection by referring to the information displayed in step 104. The common master information may also be automatically selected without the user instruction.

If the decision in step 106 is no (namely, there is only one piece of common master information) or the processing of step 108 has come to an end, then, in step 110, it is determined whether the common master corresponding to this one piece of common master information is a node other than the user's node. If the decision is no, it indicates that the user's node is the common master and therefore the processing of step 112 is not required, so that the routine of FIGS. 7 and 8 is resumed.

If the decision in step 110 is yes, then, in step 112, the synchronization status information is written to the memory block CST of the user's node with the user's node being as the slave of the common master. At this time, the synchronization status information may be the Fs indicative of the slave and may not include the information indicative of the common master.

Then, in step 114, it is determined whether there is a mismatch in Fs between master and slave. If the decision is yes, then, in step 116, a message is displayed telling that the Fs mismatch is found and therefore synchronization is disabled.

If the decision in step 102 is no, then, in step 118, a message is displayed telling that there is no common master and therefore synchronization is disabled. Then, the routine shown in FIGS. 7 and 8 is resumed.

As described above, the inventive communication control apparatus is provided for setting a plurality of node apparatuses involved in a network to either of a transmitter and a receiver of synchronization information circulated through the network to synchronize the node apparatuses with each other. In the communication control apparatus, a storage device memorizes capability information representing either of an active capability to transmit the synchronization information and a passive capability to receive the synchronization information, possessed by each of the node apparatuses. An indicating device indicates node apparatuses possessing the active capabilities according to the memorized capability information. A specifying device outputs common master information effective to specify one node apparatus among the indicated node apparatuses to a transmitter of synchronization information commonly used throughout the network. A first memory block memorizes the common master information outputted from the specifying device. A determining device implemented by the CPU 32 operates based on the memorized common master information for outputting status information effective to determine another node apparatus among the plurality of the node apparatuses to a receiver of the synchronization information transmitted from said one node apparatus. A second memory block is provided in correspondence to said another node apparatus to memorize status information of said another node apparatus. A registering device registers the outputted status information into the second memory block to set said another node apparatus to a receiver of the synchronization information.

Figure 11:
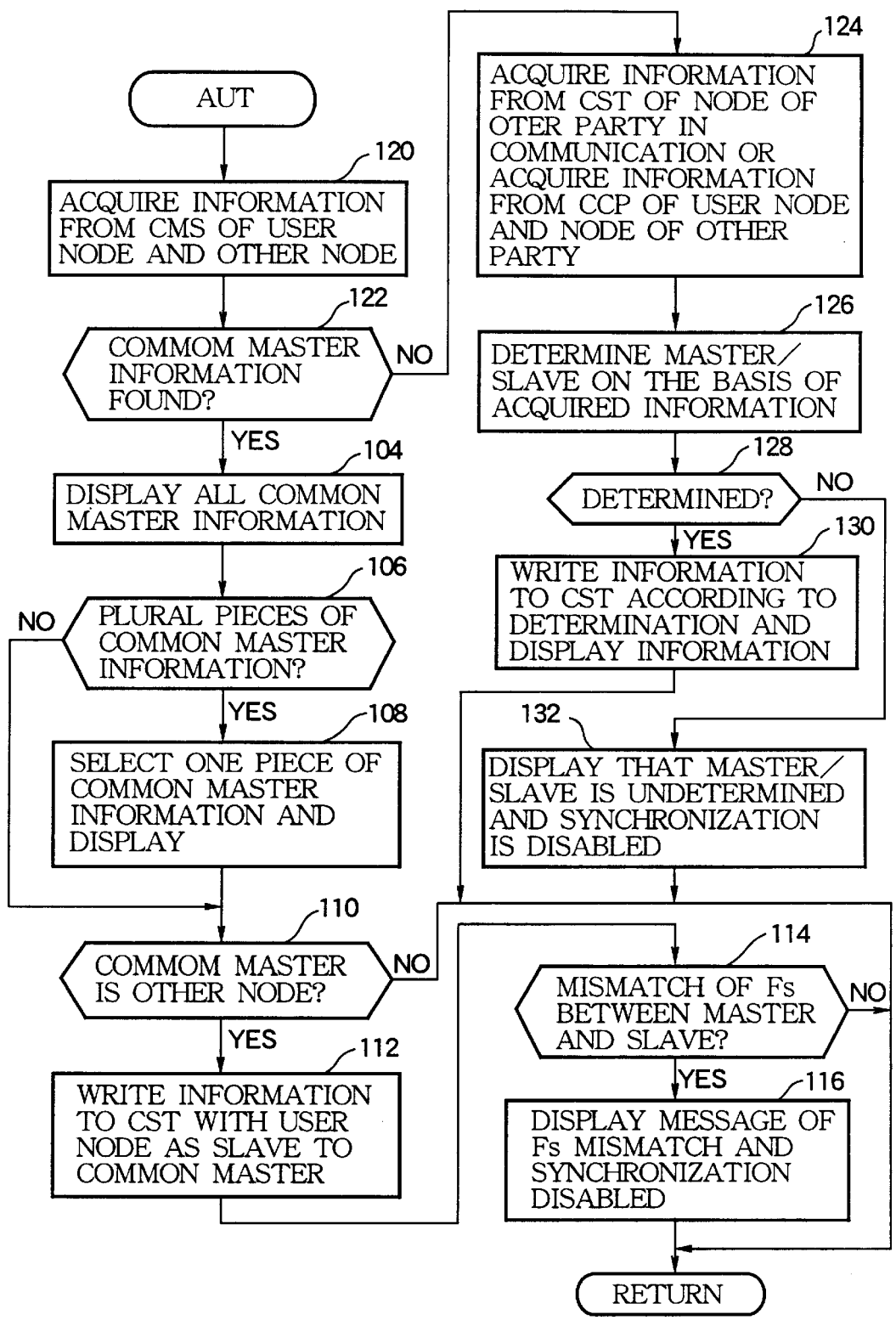
FIG. 11 is a flowchart describing auto mode processing.

FIG. 11 is a flowchart describing the auto mode processing. In step 120, information is acquired from the memory blocks CMSs of the user's node and other nodes as with step 100 described above. In step 122, it is determined whether the common master information is included in the acquired information as with step 102 described above.

If the decision in step 122 is yes (namely, the common master information is found), the processing of steps 104 through 116 is executed. The processing of steps 104 through 116 is the same as that of steps 104 through 116 described above with respect to the professional mode shown in FIG. 10, so that the description of this processing will be skipped.

If the decision in step 112 is no (namely, no common master information is found), then, in step 124, synchronization status information is acquired from the memory block CST of the nodes of other parties in data communication, or synchronization capability information is acquired from the memory blocks CCPs of the user's node and the nodes of the other parties.

In step 126, master/slave decision processing is executed on the basis of the acquired information. If the synchronization status information has been acquired from the memory block CST, the master/slave decision processing is executed as will be described with reference to FIG. 12. If the synchronization capability information has been acquired from the memory blocks CCPs, the master/slave decision processing is executed as will be described with reference to FIG. 13. In each processing shown in FIGS. 12 and 13, master/slave decision may not be executed under some conditions.

In step 128, it is determined whether master/slave decision has been made. In the processing shown in FIG. 12, it is determined whether master or slave has been determined for the user's node. In the processing shown in FIG. 13, it is determined whether master or slave has been determined for both the user's node and other nodes.

Then, in step 130, the synchronization status information is written to the memory block CST according to the decision and this synchronization status information is displayed. In the processing shown in FIG. 12, the synchronization status information is written to the memory block CST of the user's node. In the processing shown in FIG. 13, the synchronization status information is written to the memory blocks CSTs of the user's node and the other node. When the processing shown in step 130 has come to an end, the routine shown in FIGS. 7 and 8 is resumed.

If the decision in step 128 is no, then, in step 132, a message is displayed telling that master/slave is not determined and therefore synchronization is disabled. Then, the routine shown in FIGS. 7 and 8 is resumed.

As described above, the inventive communication control apparatus is provided for setting a plurality of node apparatuses including a first node apparatus and a second node apparatus involved in a network to either of a transmitter and a receiver of synchronization information circulated through the network to synchronize the node apparatuses with each other. In the communication control apparatus, a storage device memorizes common master information effective to specify the first node apparatus to a transmitter of synchronization information commonly used throughout the network. A determining device operates based on the memorized common master information for outputting status information effective to determine the second node apparatus to a receiver of the synchronization information transmitted from the first node apparatus. A memory block is provided in correspondence to the second node apparatus to memorize status information of the second node apparatus. A registering device registers the outputted status information into the memory block to set the second node apparatus to a receiver of the synchronization information.

Figure 12A:
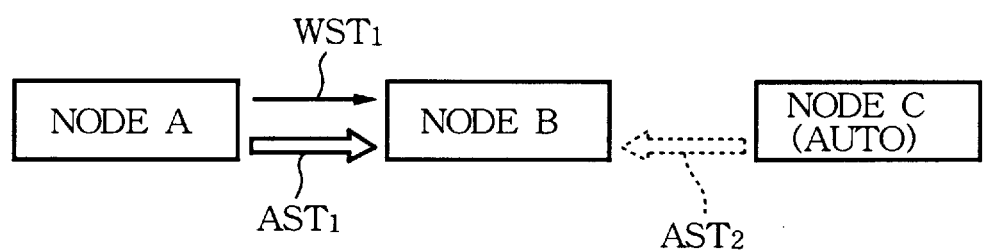
FIGS. 12A and 12B are a diagram illustrating examples of master/slave determination.
Figure 12B:
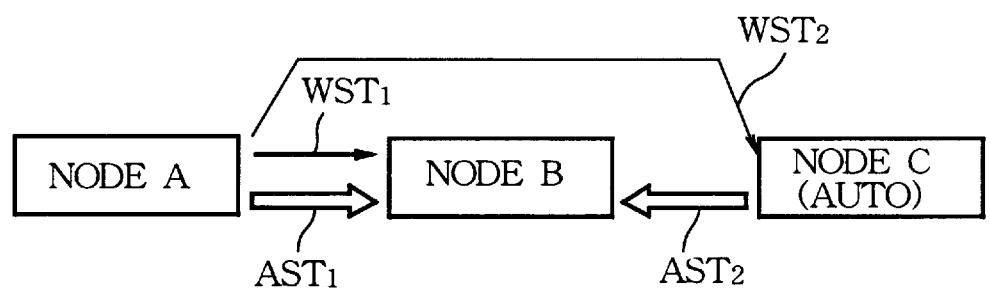

FIGS. 12A and 12B illustrate an example of the master/slave determination. In this example, the master/slave determination is automatically executed according to a first rule that the existing setting is not changed and a second rule that the determination is made by following the synchronization status information of the node of the other party in data communication.

Referring to FIG. 12A, it is assumed that node A sends an audio stream (for example, waveform data) $AST_1$ and, at the same time, clock stream $WST_1$ to node B and node A is the clock master of node B. In this state, the master/slave determination of node C is executed as follows when setting the transmission of audio stream $AST_2$ from node C in the auto mode to node B.

First, according to the first rule, the master/slave relationship is left unchanged between node A and node B. Then, the synchronization status information of node B, the communication mate of node C, is referenced. If this reference indicates that the synchronization status information indicates the reception (slave) of the clock signal from node A (master), master/slave is determined for node C such that clock stream $WST_2$ is received not from node B but from node A. Namely, the synchronization status information of node C indicates the slave state with node A being the master.

As described above, the communication control apparatus is provided for setting a plurality of node apparatuses including a first node apparatus B, a second node apparatus A and a third node apparatus C involved in a network to either of a transmitter and a receiver of synchronization information circulated through the network to synchronize the node apparatuses with each other. In the communication control apparatus, a memory block memorizes status information effective to specify the first node apparatus B to a receiver of the synchronization information transmitted from the second node apparatus A. A determining device operates based on the memorized status information for outputting status information effective to determine the third node apparatus C to a receiver of the synchronization information transmitted from the second node apparatus A. Another memory block is provided in correspondence to the third node apparatus C to memorize status information of the third node apparatus C. A registering device registers the outputted status information into said another memory block to set the third node apparatus C to a receiver of the synchronization information.

If the synchronization status information associated with the reference indicates the transmission (master) from node B, the reception of the clock signal from node B is determined for node C and the synchronization status information of node C indicates the slave state with node B being the master.

Namely, the inventive communication control apparatus is provided for setting a plurality of node apparatuses including a first node apparatus B and a second node apparatus C involved in a network to either of a transmitter and a receiver of synchronization information circulated through the network to synchronize the node apparatuses with each other. In the communication control apparatus, a memory block memorizes active status information effective to specify the first node apparatus B to a transmitter of synchronization information. A determining device operates based on the memorized active status information for outputting passive status information effective to determine the second node apparatus C to a receiver of the synchronization information transmitted from the first node apparatus B. Another memory block is provided in correspondence to the second node apparatus C to memorize status information of the second node apparatus C. A registering device registers the outputted passive status information into said another memory block to set the second node apparatus C to a receiver of the synchronization information.

In the processing shown in FIG. 12, the master node may be changed depending on the node connection sequence even if the combination of connected nodes is the same. In order to fix the master node, the manual mode or the professional mode may be selected.

FIG. 13 is a diagram illustrating another example of master/slave determination. In this example, the master/slave determination is made by following the above-mentioned first rule and a third rule that the determination is made by following the synchronization capability information of the user's node and the node of the other party (counter party node) in data communication.

One of the user's node and the counter party node becomes the data transmission side, and the other becomes the data reception side. Classification of the contents of the synchronization capability information of both sides is summarized as (A) "capable of becoming only the master", (B) "capable of becoming master or slave", and (c) "capable of becoming only the slave" as shown in "Transmission side conditions" shown in FIG. 13 for the transmission side. The reception side is also one of the above-mentioned conditions (A) through (c) as shown in "Reception side conditions" shown in FIG. 13. Combining the three conditions on the transmission side and the three conditions on the reception side results in combinations $S_1$ through $S_9$. Of these combinations, $S_1$ and $S_9$ cannot determine master/slave, while $S_2$ through $S_8$ can determine master/slave.

When the processing shown in FIG. 13 is executed in step 126 shown in FIG. 11, a comparison is made between the synchronization capability information of the data transmission node and the data reception node to determine which of $S_1$ through $S_9$ is applied. According to the determination, master/slave is determined. For example, if the determination is $S_5$, the data reception node is made master and the data transmission node is made slave. At this time, the synchronization status information of the data reception node indicates the master state while the synchronization status information of the data transmission node indicates the slave state with the data reception node being the master. It should be noted that, if the determination is $S_1$ or $S_9$, the user is alarmed in step 132.

As described above, the inventive communication control apparatus is constructed for setting a plurality of node apparatuses including a first node apparatus and a second node apparatus involved in a network to either of a transmitter and a receiver of synchronization information circulated through the network to synchronize the node apparatuses with each other. In the communication control apparatus, a storage device memorizes capability information representing either of an active capability to transmit the synchronization information and a passive capability to receive the synchronization information, owned by each of the first node apparatus and the second node apparatus. A determining device is operated according to the predetermined rule shown in FIG. 13 and according to the active capability and the passive capability owned by the first and second node apparatuses for outputting status information effective to specify either of the first and second node apparatuses to a transmitter or a receiver of the synchronization information. First and second memory blocks are provided in correspondence to the first and second node apparatuses to memorize status information of the corresponding node apparatuses. A registering device registers the status information into the first memory block to set the first node apparatus to a transmitter or a receiver of the synchronization information when the status information is determined for the first node apparatus, and registers the status information into the second memory block to set the second node apparatus to a transmitter or a receiver of the synchronization information when the status information is determined for the second node apparatus.

In the above-mentioned embodiment, the node in the auto mode may be connected to the node of another mode (manual mode or professional mode). In such a case, the first rule is applied by assuming that the master/slave setting has already been made for the node of another mode. Namely, the master/slave setting for the node in the auto mode is executed with the master/slave setting for the node in another mode unchanged.

As for the above-mentioned embodiment, an alternative may be proposed that the auto mode and the professional mode be combined into one mode. Namely, if a common master exists on the bus, it is made the master; if no common master exists on the bus, the master is determined automatically. However, this scheme has a problem that follows.

Assume here that, on the bus, a certain node is slave to the common master. If the common master disappears from the bus, it is preferable, from the viewpoint of professional use, to alarm the user that there is no common master on the bus. Namely, it is not preferable to automatically determine another master. On the other hand, if the slave node is removed from the bus and is connected to another bus for which no master is determined, it is preferable, from the viewpoint of consumer use, to automatically determine the master. In any case, it only appears to the nodes that there is no master any more and therefore they cannot make distinction between the masters.

In order to solve the above-mentioned problem, the embodiment of the invention arranges the professional mode and the auto mode separately. For professional use, the user can specify the profession mode. For consumer use, the user can specify the auto mode. If there is no common master in the professional mode, the user is alarmed in step 118. If there is no common master in the auto mode, master/slave is automatically determined in steps 124 and 126.

After the above-mentioned master/slave setting has been completed, data and clock signal transfer can be executed between nodes. The following describes an example of this transfer processing with reference to FIGS. 14 through 16.

Figure 15:
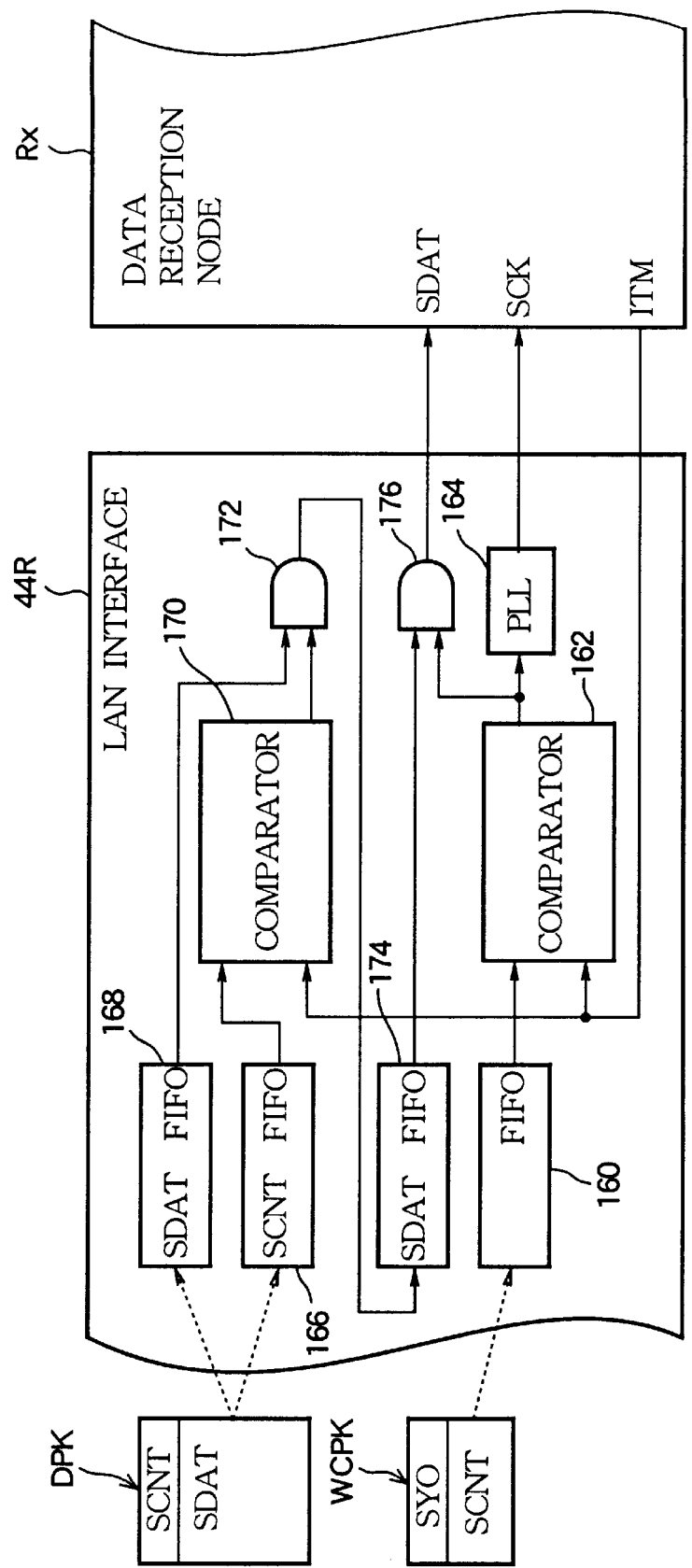
FIG. 15 is a diagram illustrating a clock reception and data reception circuit of a data reception node.
Figure 16:
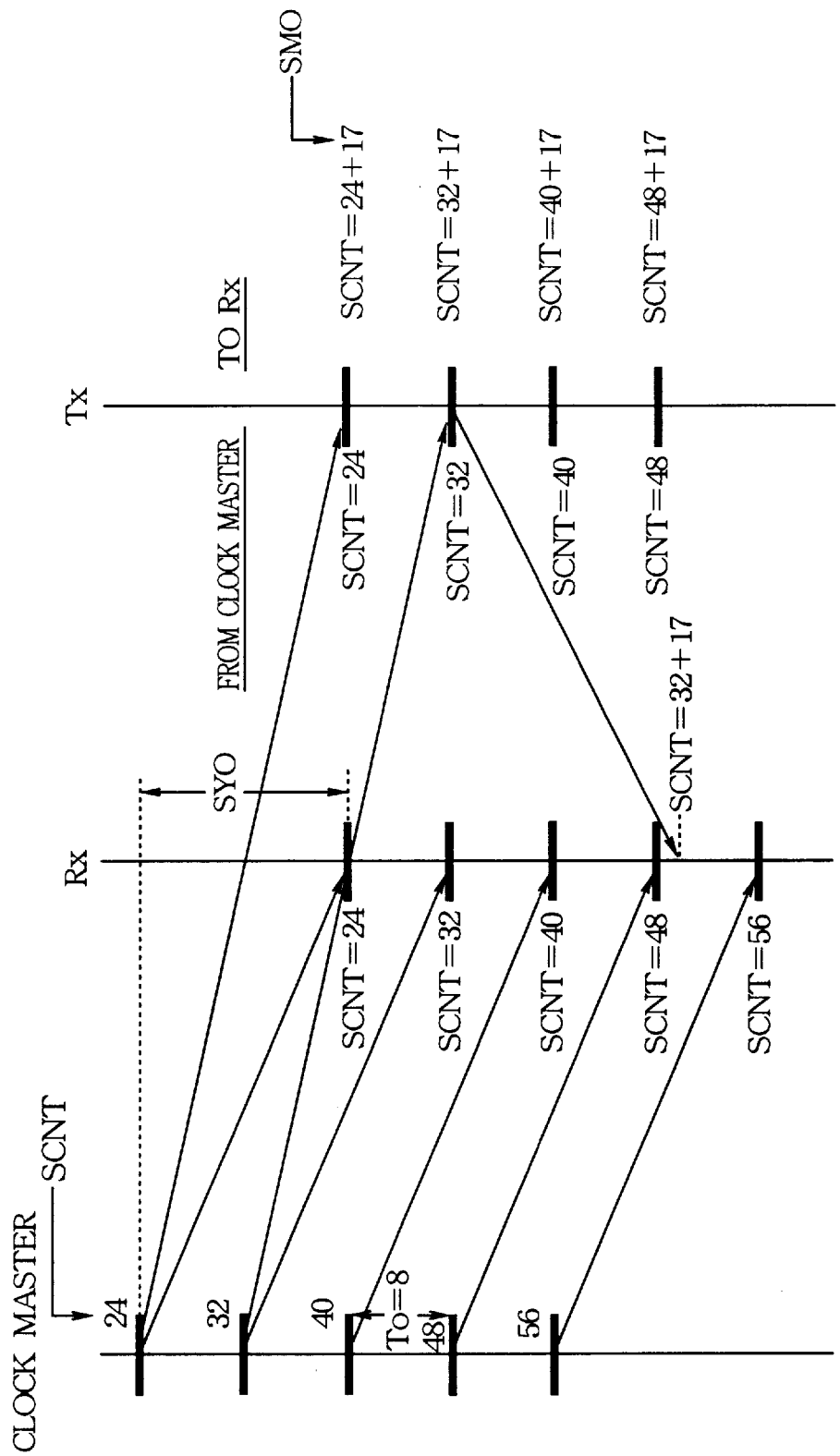
FIG. 16 is a diagram for describing the operations of the circuits shown in FIGS. 14 and 15.

A clock master node (node A shown in FIG. 12 for example) sends a WC (Word Clock) packet WCPK as shown in FIGS. 14 and 15 to the bus at an interval of To=8 shown in FIG. 16. Each WC packet WCPK includes synchronization offset information SYO and sample count information SCNT. The synchronization offset information SYO represents a count value equivalent to a transfer delay time (325 $\mu$sec) as shown in FIG. 16. The sample count information SCNT represents a sample count for each To; when To=8, sample count information SCNT representing samples counts like 24, 32, 40, and so on is sequentially generated and a WC packet WCPK is created for each piece of sample count information.

Each WC packet WCPK is received through a LAN interface 44T at a data transmission node Tx shown in FIG. 14 (node C shown in FIG. 12 for example) and a LAN interface 44R at a data reception node Rx shown in FIG. 15 (node B shown in FIG. 12 for example). Referring to FIG. 16, SCNT=24, 32, 40, and so on along vertical lines Tx and Rx represent sample count timings at the data transmission node Tx and the data reception node Rx, respectively.

The data transmission node Tx sends a data packet DPK to the data reception node Rx at each of the sample count timings 24, 32, 40, and so on. Each data packet DPK includes sample count information SCNT and sample data SDAT for four samples.

In the LAN interface 44T shown in FIG. 14, a sum total of the synchronization offset information SYO and the sample count information SCNT included in the WC packet WCPK is inputted in a FIFO (Fist In, First Out memory) 140 and the sample count information SCNT included in the WC packet WCPK is inputted in a FIFO 142. A comparator 144 compares time information ITM from a timer for counting a high-speed clock signal in the node Tx with the sum total supplied from the FIFO 140 and, when a match is found, output a match signal to trigger a PLL (Phase Locked Loop) circuit 146. Consequently, the PLL circuit 146 generates a clock pulse in timed relations corresponding to 24, 32, 40, and so on indicated along the vertical line Tx shown in FIG. 16, the generated timing pulse being supplied to the node Tx as a sampling clock signal SCK.

According to the match signal supplied from the comparator 144, an AND gate 148 supplies the sample count information SCNT supplied from the FIFO 140 to the node Tx and an adder 150. The adder 150 adds sample offset information SMO to the sample count information SCNT, the sample offset information being 17 for example (refer to FIG. 16). Consequently, sample offset 17 is added to sample count 32 for example, sample count information SCNT representing 32+17 being inputted from the adder 150 into a FIFO 152. Sample data SDAT for four samples corresponding to sample count timing 32 are inputted in a FIFO 154 from the node Tx. The sample count information SCNT in the FIFO 152 and the sample data SDAT in the FIFO 154 constitute a data packet DPK, which is sent to the node Rx in a timed relation of sample count 32 (refer to FIG. 16).

In the LAN interface 44R shown in FIG. 15, the sum total of the synchronization offset information SYO and the sample count information SCNT included in the WC packet WCPK supplied from the clock master is inputted in a FIFO 160. A comparator 162 compares time information from the timer for counting the high-speed clock signal in the node Rx with the sum total value from the FIFO 160 and, when a match is found, outputs a match signal to trigger a PLL circuit 164. Consequently, the PLL circuit 164 generates a clock pulse in timed relations corresponding to 24, 32, 40 and so on along the vertical line Rx shown in FIG. 16, the generated clock pulse being supplied to the node Rx as a sampling clock signal SCK.

When the timing of sample count 49 is reached, the data pack DPK including the sample count information SCNT of sample count (32+17) and the sample data SDAT arrives at the interface 44R. The sample count information SCNT and the sample data SDAT are inputted in the a FIFO 166 and a FIFO 168 respectively. A comparator 170 compares the sample count information SCNT with time information ITM from the timer in the node Rx and, when a match is found, supplies a match signal to an AND gate 172. Consequently, the sample data SDAT in the FIFO 168 are supplied to a FIFO 174 through the AND gate 172.

Next, when the timing of sample count 56 is reached, a match output from the comparator 162 is supplied to an AND gate 176. Consequently, the sample data in the FIFO 174 are supplied to the node Rx through the AND gate 176. In the node Rx, four samples of sample data constituting the sample data SDAT are processed according to the sampling clock signal SCK.

The present invention is not limited to the above-mentioned embodiments. Various changes and modifications may be made within the scope of the invention. For example, modifications that follow may be made.

(1) Sampling clock frequencies are not limited to 44.1 KHz and 48 KHz. For example, other values such as 96 KHz may also be used.

(2) In the professional mode, the user can specify two common masters, one of which is placed standby. In this case, the user specifies beforehand a primary common master and a secondary common master. When the primary common master fails, the secondary common master supersedes it.

As mentioned above and according to the invention, the manual specification by the user for transmission/reception is facilitated by indicating the transmission capability or the reception capability for each node apparatus connected to a network on the basis of synchronization capability information, the reception of synchronization information is automatically determined on the basis of common master information, the reception of synchronization information is automatically determined on the basis of synchronization status information, and the transmission/reception of synchronization information is automatically determined on the basis of synchronization capability information. Consequently, the transmission/reception of synchronization information can be set appropriately and simply.

What is claimed is:

1. A communication control apparatus for setting a plurality of node apparatuses involved in a network to either of a transmitter and a receiver of synchronization information circulated through the network to synchronize the node apparatuses with each other, the communication control apparatus comprising:

a storage device that memorizes capability information representing either of an active capability to transmit the synchronization information and a passive capability to receive the synchronization information, owned by each of the node apparatuses;

an indicating device that indicates the active capabilities and the passive capabilities owned by the node apparatuses involved in the network according to the memorized capability information;

a specifying device that is operated in association with the indicated active capabilities and the passive capabilities of the node apparatuses for outputting status information effective to specify each node apparatus to a transmitter or a receiver of the synchronization information;

a plurality of memory blocks that are provided in correspondence to the plurality of the node apparatuses to memorize status information of the corresponding node apparatuses; and a registering device that registers each of the outputted status information into each memory block to set the corresponding node apparatus to a transmitter of the synchronization information when the status information specifies the transmitter, and to set the corresponding node apparatus to a receiver of the synchronization information when the status information specifies the receiver.

2. The communication control apparatus according to claim 1, wherein the plurality of the node apparatuses can transfer data through the network at one of multiple sampling frequencies based on the synchronization information, such that the storage device stores a multiple of the capability information in correspondence to the multiple sampling frequencies, and such that each memory block stores a multiple of the status information corresponding to the multiple sampling frequencies.

3. The communication control apparatus according to claim 1, wherein the plurality of the node apparatuses are connected to each other through a local area network.

4. The communication control apparatus according to claim 3, wherein the plurality of the node apparatuses transact music data representing a music piece with each other in response to the synchronization information through the local area network to constitute a music system for generating the music piece.

5. A communication control apparatus for setting a plurality of node apparatuses including a first node apparatus and a second node apparatus involved in a network to either of a transmitter and a receiver of synchronization information circulated through the network to synchronize the node apparatuses with each other, the communication control apparatus comprising:

a storage device that memorizes common master information effective to specify the first node apparatus to a transmitter of synchronization information commonly used throughout the network;

a determining device that operates based on the memorized common master information for outputting status information effective to determine the second node apparatus to a receiver of the synchronization information transmitted from the first node apparatus;

a memory block that is provided in correspondence to the second node apparatus to memorize status information of the second node apparatus; and a registering device that registers the outputted status information into the memory block to set the second node apparatus to a receiver of the synchronization information.

6. The communication control apparatus according to claim 5, wherein the plurality of the node apparatuses can transfer data through the network at one of multiple sampling frequencies based on the synchronization information, such that the storage device stores a multiple of the common master information in correspondence to the multiple sampling frequencies, and such that the memory block stores a multiple of the status information corresponding to the multiple sampling frequencies.

7. The communication control apparatus according to claim 5, wherein the plurality of the node apparatuses are connected to each other through a local area network.

8. The communication control apparatus according to claim 7, wherein the plurality of the node apparatuses transact music data representing a music piece with each other in response to the synchronization information through the local area network to constitute a music system for generating the music piece.

9. A communication control apparatus for setting a plurality of node apparatuses involved in a network to either of a transmitter and a receiver of synchronization information circulated through the network to synchronize the node apparatuses with each other, the communication control apparatus comprising:

a storage device that memorizes capability information representing either of an active capability to transmit the synchronization information and a passive capability to receive the synchronization information, possessed by each of the node apparatuses;

an indicating device that indicates node apparatuses possessing the active capabilities according to the memorized capability information;

a specifying device that outputs common master information effective to specify one node apparatus among the indicated node apparatuses to a transmitter of synchronization information commonly used throughout the network;

a first memory block that memorizes the common master information outputted from the specifying device;

a determining device that operates based on the memorized common master information for outputting status information effective to determine another node apparatus among the plurality of the node apparatuses to a receiver of the synchronization information transmitted from said one node apparatus;

a second memory block that is provided in correspondence to said another node apparatus to memorize status information of said another node apparatus; and a registering block that registers the outputted status information into the second memory block to set said another node apparatus to a receiver of the synchronization information.

10. The communication control apparatus according to claim 9, wherein the plurality of the node apparatuses can transfer data through the network at one of multiple sampling frequencies based on the synchronization information, such that the storage device stores a multiple of the capability information in correspondence to the multiple sampling frequencies, that the first memory block stores a multiple of the common master information in correspondence to the multiple sampling frequencies, and that the second memory block stores a multiple of the status information corresponding to the multiple sampling frequencies.

11. The communication control apparatus according to claim 9, wherein the plurality of the node apparatuses are connected to each other through a local area network.

12. The communication control apparatus according to claim 11, wherein the plurality of the node apparatuses transact music data representing a music piece with each other in response to the synchronization information through the local area network to constitute a music system for generating the music piece.

13. A communication control apparatus for setting a plurality of node apparatuses including a first node apparatus, a second node apparatus and a third node apparatus involved in a network to either of a transmitter and a receiver of synchronization information circulated through the network to synchronize the node apparatuses with each other, the communication control apparatus comprising:

a memory block that memorizes status information effective to specify the first node apparatus to a receiver of the synchronization information transmitted from the second node apparatus;

a determining device that operates based on the memorized status information for outputting status information effective to determine the third node apparatus to a receiver of the synchronization information transmitted from the second node apparatus;

another memory block that is provided in correspondence to the third node apparatus to memorize status information of the third node apparatus; and a registering device that registers the outputted status information into said another memory block to set the third node apparatus to a receiver of the synchronization information.

14. The communication control apparatus according to claim 13, wherein the plurality of the node apparatuses can transfer data through the network at one of multiple sampling frequencies based on the synchronization information, such that the memory blocks store a multiple of the status information in correspondence to the multiple sampling frequencies.

15. The communication control apparatus according to claim 13, wherein the plurality of the node apparatuses are connected to each other through a local area network.

16. The communication control apparatus according to claim 15, wherein the plurality of the node apparatuses transact music data representing a music piece with each other in response to the synchronization information through the local area network to constitute a music system for generating the music piece.

17. A communication control apparatus for setting a plurality of node apparatuses including a first node apparatus and a second node apparatus involved in a network to either of a transmitter and a receiver of synchronization information circulated through the network to synchronize the node apparatuses with each other, the communication control apparatus comprising:

a memory block that memorizes active status information effective to specify the first node apparatus to a transmitter of synchronization information;

a determining device that operates based on the memorized active status information for outputting passive status information effective to determine the second node apparatus to a receiver of the synchronization information transmitted from the first node apparatus;

another memory block that is provided in correspondence to the second node apparatus to memorize status information of the second node apparatus; and a registering device that registers the outputted passive status information into said another memory block to set the second node apparatus to a receiver of the synchronization information.

18. The communication control apparatus according to claim 17, wherein the plurality of the node apparatuses can transfer data through the network at one of multiple sampling frequencies based on the synchronization information, such that said memory block memorizes a multiple of the active status information in correspondence to the multiple sampling frequencies, and such that said another memory block memorizes a multiple of the passive status information corresponding to the multiple sampling frequencies.

19. The communication control apparatus according to claim 17, wherein the plurality of the node apparatuses are connected to each other through a local area network.

20. The communication control apparatus according to claim 19, wherein the plurality of the node apparatuses transact music data representing a music piece with each other in response to the synchronization information through the local area network to constitute a music system for generating the music piece.

21. A communication control apparatus for setting a plurality of node apparatuses including a first node apparatus and a second node apparatus involved in a network to either of a transmitter and a receiver of synchronization information circulated through the network to synchronize the node apparatuses with each other, the communication control apparatus comprising:

a storage device that memorizes capability information representing either of an active capability to transmit the synchronization information and a passive capability to receive the synchronization information, owned by each of the first node apparatus and the second node apparatus;

a determining device that is operated according to a predetermined rule and according to the active capability and the passive capability owned by the first and second node apparatuses for outputting status information effective to specify either of the first and second node apparatuses to a transmitter or a receiver of the synchronization information;

first and second memory blocks that are provided in correspondence to the first and second node apparatuses to memorize status information of the corresponding node apparatuses; and a registering device that registers the status information into the first memory block to set the first node apparatus to a transmitter or a receiver of the synchronization information when the status information is determined for the first node apparatus, and that registers the status information into the second memory block to set the second node apparatus to a transmitter or a receiver of the synchronization information when the status information is determined for the second node apparatus.

22. The communication control apparatus according to claim 21, wherein the plurality of the node apparatuses can transfer data through the network at one of multiple sampling frequencies based on the synchronization information, such that the storage device stores a multiple of the capability information in correspondence to the multiple sampling frequencies, and such that the first and second memory blocks store a multiple of the status information corresponding to the multiple sampling frequencies.

23. The communication control apparatus according to claim 21, wherein the plurality of the node apparatuses are connected to each other through a local area network.

24. The communication control apparatus according to claim 23, wherein the plurality of the node apparatuses transact music data representing a music piece with each other in response to the synchronization information through the local area network to constitute a music system for generating the music piece.

25. A communication control method for setting a plurality of node apparatuses involved in a network to either of a transmitter and a receiver of synchronization information circulated through the network to synchronize the node apparatuses with each other, the communication control method comprising the steps of:

collecting capability information representing either of an active capability to transmit the synchronization information and a passive capability to receive the synchronization information, owned by each of the node apparatuses;

indicating the active capabilities and the passive capabilities owned by the node apparatuses involved in the network according to the collected capability information;

outputting status information effective to specify each node apparatus to a transmitter or a receiver of the synchronization information by referring to the indicated active capabilities and the passive capabilities of the respective node apparatuses; and registering each of the outputted status information into each of a plurality of memory blocks that are provided in correspondence to the plurality of the node apparatuses, thereby setting the corresponding node apparatus to a transmitter of the synchronization information when the registered status information specifies the transmitter, and setting the corresponding node apparatus to a receiver of the synchronization information when the registered status information specifies the receiver.

26. A communication control method for setting a plurality of node apparatuses including a first node apparatus and a second node apparatus involved in a network to either of a transmitter and a receiver of synchronization information circulated through the network to synchronize the node apparatuses with each other, the communication control method comprising the steps of:

detecting common master information effective to specify the first node apparatus to a transmitter of synchronization information commonly used throughout the network; then outputting status information effective to determine the second node apparatus to a receiver of the synchronization information transmitted from the first node apparatus according to the detected common master information; and registering the outputted status information into a memory block that is provided in correspondence to the second node apparatus, thereby setting the second node apparatus to a receiver of the synchronization information.

27. A communication control method for setting a plurality of node apparatuses involved in a network to either of a transmitter and a receiver of synchronization information circulated through the network to synchronize the node apparatuses with each other, the communication control method comprising the steps of:

collecting capability information representing either of an active capability to transmit the synchronization information and a passive capability to receive the synchronization information, possessed by each of the node apparatuses;

indicating node apparatuses possessing the active capabilities according to the collected capability information;

outputting common master information effective to specify one node apparatus among the indicated node apparatuses to a transmitter of synchronization information commonly used throughout the network;

outputting status information effective to determine another node apparatus among the plurality of the node apparatuses to a receiver of the synchronization information transmitted from said one node apparatus, based on the outputted common master information; and registering the outputted status information into a memory block that is provided in correspondence to said another node apparatus, thereby setting said another node apparatus to a receiver of the synchronization information.

28. A communication control method for setting a plurality of node apparatuses including a first node apparatus, a second node apparatus and a third node apparatus involved in a network to either of a transmitter and a receiver of synchronization information circulated through the network to synchronize the node apparatuses with each other, the communication control method comprising the steps of:

detecting status information effective to specify the first node apparatus to a receiver of the synchronization information transmitted from the second node apparatus; then outputting status information effective to determine the third node apparatus to a receiver of the synchronization information transmitted from the second node apparatus, based on the detected status information; and registering the outputted status information into a memory block that is provided in correspondence to the third node apparatus, thereby setting the third node apparatus to a receiver of the synchronization information.

29. A communication control method for setting a plurality of node apparatuses including a first node apparatus and a second node apparatus involved in a network to either of a transmitter and a receiver of synchronization information circulated through the network to synchronize the node apparatuses with each other, the communication control method comprising the steps of:

detecting active status information effective to specify the first node apparatus to a transmitter of synchronization information; then outputting passive status information effective to determine the second node apparatus to a receiver of the synchronization information transmitted from the first node apparatus, in response to the detected active status information; and registering the outputted passive status information into a memory block that is provided in correspondence to the second node apparatus, thereby setting the second node apparatus to a receiver of the synchronization information.

30. A communication control method for setting a plurality of node apparatuses including a first node apparatus and a second node apparatus involved in a network to either of a transmitter and a receiver of synchronization information circulated through the network to synchronize the node apparatuses with each other, the communication control method comprising the steps of:

collecting capability information representing either of an active capability to transmit the synchronization information and a passive capability to receive the synchronization information, owned by each of the first node apparatus and the second node apparatus;

outputting status information effective to specify either of the first and second node apparatuses to a transmitter or a receiver of the synchronization information according to a predetermined rule and according to the active capability and the passive capability owned by the first and second node apparatuses;

registering the outputted status information into a first memory block provided in correspondence to the first node apparatus, thereby setting the first node apparatus to a transmitter or a receiver of the synchronization information when the outputted status information is determined for the first node apparatus; and otherwise registering the outputted status information into a second memory block provided in correspondence to the second node apparatus, thereby setting the second node apparatus to a transmitter or a receiver of the synchronization information when the outputted status information is determined for the second node apparatus.

31. A machine readable medium for use in a communication control apparatus having a CPU for setting a plurality of node apparatuses involved in a network to either of a transmitter and a receiver of synchronization information circulated through the network to synchronize the node apparatuses with each other, the medium containing program instructions executable by the CPU for causing the communication control apparatus to perform a method comprising the steps of:

collecting capability information representing either of an active capability to transmit the synchronization information and a passive capability to receive the synchronization information, owned by each of the node apparatuses;

indicating the active capabilities and the passive capabilities owned by the node apparatuses involved in the network according to the collected capability information;

outputting status information effective to specify each node apparatus to a transmitter or a receiver of the synchronization information by referring to the indicated active capabilities and the passive capabilities of the respective node apparatuses; and registering each of the outputted status information into each of a plurality of memory blocks that are provided in correspondence to the plurality of the node apparatuses, thereby setting the corresponding node apparatus to a transmitter of the synchronization information when the registered status information specifies the transmitter, and setting the corresponding node apparatus to a receiver of the synchronization information when the registered status information specifies the receiver.

32. A machine readable medium for use in a communication control apparatus having a CPU for setting a plurality of node apparatuses including a first node apparatus and a second node apparatus involved in a network to either of a transmitter and a receiver of synchronization information circulated through the network to synchronize the node apparatuses with each other, the medium containing program instructions executable by the CPU for causing the communication control apparatus to perform a method comprising the steps of:

detecting common master information effective to specify the first node apparatus to a transmitter of synchronization information commonly used throughout the network; then outputting status information effective to determine the second node apparatus to a receiver of the synchronization information transmitted from the first node apparatus according to the detected common master information; and registering the outputted status information into a memory block that is provided in correspondence to the second node apparatus, thereby setting the second node apparatus to a receiver of the synchronization information.

33. A machine readable medium for use in a communication control apparatus having a CPU for setting a plurality of node apparatuses involved in a network to either of a transmitter and a receiver of synchronization information circulated through the network to synchronize the node apparatuses with each other, the medium containing program instructions executable by the CPU for causing the communication control apparatus to perform a method comprising the steps of:

collecting capability information representing either of an active capability to transmit the synchronization information and a passive capability to receive the synchronization information, possessed by each of the node apparatuses;

indicating node apparatuses possessing the active capabilities according to the collected capability information;

outputting common master information effective to specify one node apparatus among the indicated node apparatuses to a transmitter of synchronization information commonly used throughout the network;

outputting status information effective to determine another node apparatus among the plurality of the node apparatuses to a receiver of the synchronization information transmitted from said one node apparatus, based on the outputted common master information; and registering the outputted status information into a memory block that is provided in correspondence to said another node apparatus, thereby setting said another node apparatus to a receiver of the synchronization information.

34. A machine readable medium for use in a communication control apparatus having a CPU for setting a plurality of node apparatuses including a first node apparatus, a second node apparatus and a third node apparatus involved in a network to either of a transmitter and a receiver of synchronization information circulated through the network to synchronize the node apparatuses with each other, the medium containing program instructions executable by the CPU for causing the communication control apparatus to perform a method comprising the steps of:

detecting status information effective to specify the first node apparatus to a receiver of the synchronization information transmitted from the second node apparatus; then outputting status information effective to determine the third node apparatus to a receiver of the synchronization information transmitted from the second node apparatus, based on the detected status information; and registering the outputted status information into a memory block that is provided in correspondence to the third node apparatus, thereby setting the third node apparatus to a receiver of the synchronization information.

35. A machine readable medium for use in a communication control apparatus having a CPU for setting a plurality of node apparatuses including a first node apparatus and a second node apparatus involved in a network to either of a transmitter and a receiver of synchronization information circulated through the network to synchronize the node apparatuses with each other, the medium containing program instructions executable by the CPU for causing the communication control apparatus to perform a method comprising the steps of:

detecting active status information effective to specify the first node apparatus to a transmitter of synchronization information; then outputting passive status information effective to determine the second node apparatus to a receiver of the synchronization information transmitted from the first node apparatus, in response to the detected active status information; and registering the outputted passive status information into a memory block that is provided in correspondence to the second node apparatus, thereby setting the second node apparatus to a receiver of the synchronization information.

36. A machine readable medium for use in a communication control apparatus having a CPU for setting a plurality of node apparatuses including a first node apparatus and a second node apparatus involved in a network to either of a transmitter and a receiver of synchronization information circulated through the network to synchronize the node apparatuses with each other, the medium containing program instructions executable by the CPU for causing the communication control apparatus to perform a method comprising the steps of:

collecting capability information representing either of an active capability to transmit the synchronization information and a passive capability to receive the synchronization information, owned by each of the first node apparatus and the second node apparatus;

outputting status information effective to specify either of the first and second node apparatuses to a transmitter or a receiver of the synchronization information according to a predetermined rule and according to the active capability and the passive capability owned by the first and second node apparatuses;

registering the outputted status information into a first memory block provided in correspondence to the first node apparatus, thereby setting the first node apparatus to a transmitter or a receiver of the synchronization information when the outputted status information is determined for the first node apparatus; and otherwise registering the outputted status information into a second memory block provided in correspondence to the second node apparatus, thereby setting the second node apparatus to a transmitter or a receiver of the synchronization information when the outputted status information is determined for the second node apparatus.

* * * * *